(12) United States Patent
Kim et al.

(10) Patent No.: US 11,509,496 B2
(45) Date of Patent: *Nov. 22, 2022

(54) ELECTRONIC DEVICE AND METHOD FOR CONTINUOUSLY REPRODUCING MULTIMEDIA CONTENT IN EXTERNAL ELECTRONIC DEVICE

(71) Applicant: Samsung Electronics Co., Ltd., Gyeonggi-do (KR)

(72) Inventors: Hyunkyoung Kim, Gyeonggi-do (KR); Jongho Kim, Gyeonggi-do (KR); Minjung Sohn, Gyeonggi-do (KR); Kyuho Shin, Gyeonggi-do (KR); Younghak Oh, Gyeonggi-do (KR); Pilsik Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/396,108

(22) Filed: Aug. 6, 2021

(65) Prior Publication Data

US 2021/0377065 A1    Dec. 2, 2021

Related U.S. Application Data

(63) Continuation of application No. 16/556,973, filed on Aug. 30, 2019, now Pat. No. 11,153,112.

(30) Foreign Application Priority Data

Aug. 30, 2018   (KR) .......................... 10-2018-0103063

(51) Int. Cl.
*G06F 15/16* (2006.01)
*H04L 12/28* (2006.01)

(52) U.S. Cl.
CPC ........ *H04L 12/2812* (2013.01); *H04L 12/282* (2013.01); *H04L 12/2809* (2013.01); *H04L 12/2829* (2013.01)

(58) Field of Classification Search
CPC ............. H04L 65/1083; H04L 12/2829; H04L 67/125; H04L 12/2809; H04L 12/282; H04L 12/2812; H04L 67/12
See application file for complete search history.

(56) References Cited

U.S. PATENT DOCUMENTS 8,266,341 B2   9/2012   Choi et al.
9,549,021 B2   1/2017   Arora et al.
(Continued)

FOREIGN PATENT DOCUMENTS

EP    2 680 500      1/2014
KR    10-0765368    10/2007
(Continued)

OTHER PUBLICATIONS

European Search Report dated Jun. 28, 2021 issued in counterpart application No. 21158775.3-1213, 7 pages.
(Continued)

*Primary Examiner* — Padma Mundur
(74) *Attorney, Agent, or Firm* — The Farrell Law Firm, P.C.

(57) ABSTRACT

An electronic device and a method for controlling the electronic device are provided. Multimedia content is reproduced in the electronic device. After the reproduction of the multimedia content in the electronic device, a display of the electronic device is controlled to display a plurality of objects respectively indicating a plurality of external devices which is identified by the electronic device. In response to input to an object among the plurality of objects, an external
(Continued)

device indicated by the object is authorized to continuously reproduce multimedia content.

14 Claims, 30 Drawing Sheets

(56) References Cited

U.S. PATENT DOCUMENTS

| | | |
|---|---|---|
| 2007/0053514 A1 | 3/2007 | Imai et al. |
| 2012/0210346 A1* | 8/2012 | McCoy ............ H04N 21/41265 725/25 |
| 2013/0010195 A1 | 1/2013 | Daioku |
| 2014/0053078 A1* | 2/2014 | Kannan .................. H04W 4/21 715/748 |
| 2014/0179234 A1 | 6/2014 | Lee |
| 2014/0195620 A1 | 7/2014 | Srinivasan |
| 2015/0195323 A1 | 7/2015 | Park |
| 2016/0057553 A1 | 2/2016 | Ryu et al. |
| 2016/0142865 A1 | 5/2016 | Park et al. |
| 2016/0253145 A1 | 9/2016 | Lee et al. |
| 2016/0366468 A1* | 12/2016 | Seo ....................... G06F 3/1423 |
| 2017/0139657 A1 | 5/2017 | Shah et al. |
| 2018/0167908 A1 | 6/2018 | Kotreka et al. |

FOREIGN PATENT DOCUMENTS

| | | |
|---|---|---|
| KR | 1020140082223 | 7/2014 |
| KR | 10-1437446 | 9/2014 |
| KR | 1020150043373 | 4/2015 |
| KR | 10-1533368 | 7/2015 |
| KR | 1020150104176 | 9/2015 |
| KR | 1020160146313 | 12/2016 |
| KR | 10-1733057 | 5/2017 |
| KR | 10-1869360 | 6/2018 |

OTHER PUBLICATIONS

Jake Peterson, "Netflix 101: How to Cast Shows & Movies from Your Phone to Your TV < Smartphones: Gadget Hacks", Jul. 14, 2017, 7 pages.

International Search Report dated Dec. 26, 2019 issued in counterpart application No. PCT/KR2019/011170, 8 pages.

European Search Report dated Jan. 27, 2020 issued in counterpart application No. 19194701.9-1213, 8 pages.

Indian Examination Report dated Feb. 2, 2022 issued in counterpart application No. 202117009875, 7 pages.

Korean Office Action dated Jul. 28, 2022 issued in counterpart application No. 10-2018-0103063, 26 pages.

* cited by examiner

ELECTRONIC DEVICE AND METHOD FOR CONTINUOUSLY REPRODUCING MULTIMEDIA CONTENT IN EXTERNAL ELECTRONIC DEVICE

PRIORITY

This application is a Continuation Application of U.S. application Ser. No. 16/556,973, filed on Aug. 30, 2019 in the U.S. Patent and Trademark Office, which is based on and claims priority under 35 U.S.C. § 119 to Korean Patent Application No. 10-2018-0103063, filed on Aug. 30, 2018 in the Korean Intellectual Property Office, the entire disclosure of each of which is incorporated herein by reference.

BACKGROUND

1. Field

The present disclosure relates to an electronic device for enabling an external electronic device to continuously reproduce multimedia content and an operation method thereof.

2. Description of Related Art

The Internet is evolving to an Internet of things (IoT) network exchanging and processing information between dispersed elements such as things. An Internet of everything (IoE) technology, which is a combination of a big data processing technology, etc. through connection with a cloud server, etc. and IoT technology, is emerging. To implement IoT, technological elements such as a sensing technology, a wired/wireless communication and network infrastructure, a service interface technology, and a security technology are required, so technologies such as a sensor network for connection between things, machine to machine (M2M), machine type communication (MTC), etc. are being researched.

In the IoT environment, an intelligent Internet technology service of creating a new value for human life by collecting and analyzing data generated from connected things may be provided. IoT may be applied to a variety of fields such as a smart home, a smart building, a smart city, a smart car or connected car, a smart grid, a health care, a smart home appliance, an advanced medical service, etc. through fusion and combination between the existing information technology (IT) and various industries.

In a state of reproducing multimedia content by using an electronic device or in a state of stopping the reproduction of the multimedia content by using the electronic device, a user of an electronic device (e.g., a smart phone, etc.) may enter an environment with IoT. The environment with IoT may include other electronic devices (e.g., a TV, a speaker, a refrigerator, etc.) in addition to the electronic device. Accordingly, a solution for continuously reproducing the multimedia content in the other electronic devices may be demanded.

Technological solutions the present disclosure seeks to achieve are not limited to the above-mentioned technological solutions, and other technological solutions not mentioned above would be able to be clearly understood by a person having ordinary skill in the art.

SUMMARY

An aspect of the present disclosure provides electronic device and a method thereof for providing an enhanced user experience (UX) in an IoT environment, by displaying a visual object for continuously reproducing multimedia content in an external electronic device.

In accordance with an aspect of the present disclosure, an electronic device is provided. The electronic device includes a display, a memory configured to store instructions, at least one communication circuitry, and at least one processor. When executing the instructions the at least one processor is configured to reproduce multimedia content in the electronic device. After the reproduction of the multimedia content in the electronic device, the display is controlled to display a plurality of objects respectively indicating a plurality of external devices which is identified by the electronic device. In response to input to an object among the plurality of objects, an external device indicated by the object is authorized to continuously reproduce the multimedia content.

In accordance with another aspect of the present disclosure, a method for controlling an electronic device is provided. Multimedia content is reproduced in the electronic device. After the reproduction of the multimedia content in the electronic device, a display of the electronic device is controlled to display a plurality of objects respectively indicating a plurality of external devices which is identified by the electronic device. In response to input to an object among the plurality of objects, an external device indicated by the object is authorized to continuously reproduce multimedia content.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Terms used in the present disclosure are used to describe certain embodiments, but are not intended to limit the present disclosure. An expression in a singular form may include an expression in a plural form unless otherwise clearly indicated in the context. The terms used herein may have the same meanings as those generally understood by a person having ordinary skill in the art disclosed in the present disclosure. Among the terms used in the present disclosure, terms defined in a general dictionary may be interpreted as having the same or similar meanings as the contextual meanings of a related technology, but are not intended to be interpreted as having ideal or excessively formal meanings unless clearly defined in the present disclosure. According to a particular case, even the terms defined in the present disclosure may not be construed as excluding an embodiment of the present disclosure.

In an embodiment of the present disclosure described below, a hardware access method is disclosed as an example. However, various embodiments of the present disclosure include a technology using hardware and software, so various embodiments of the present disclosure do not exclude a software based access method.

Figure 1:
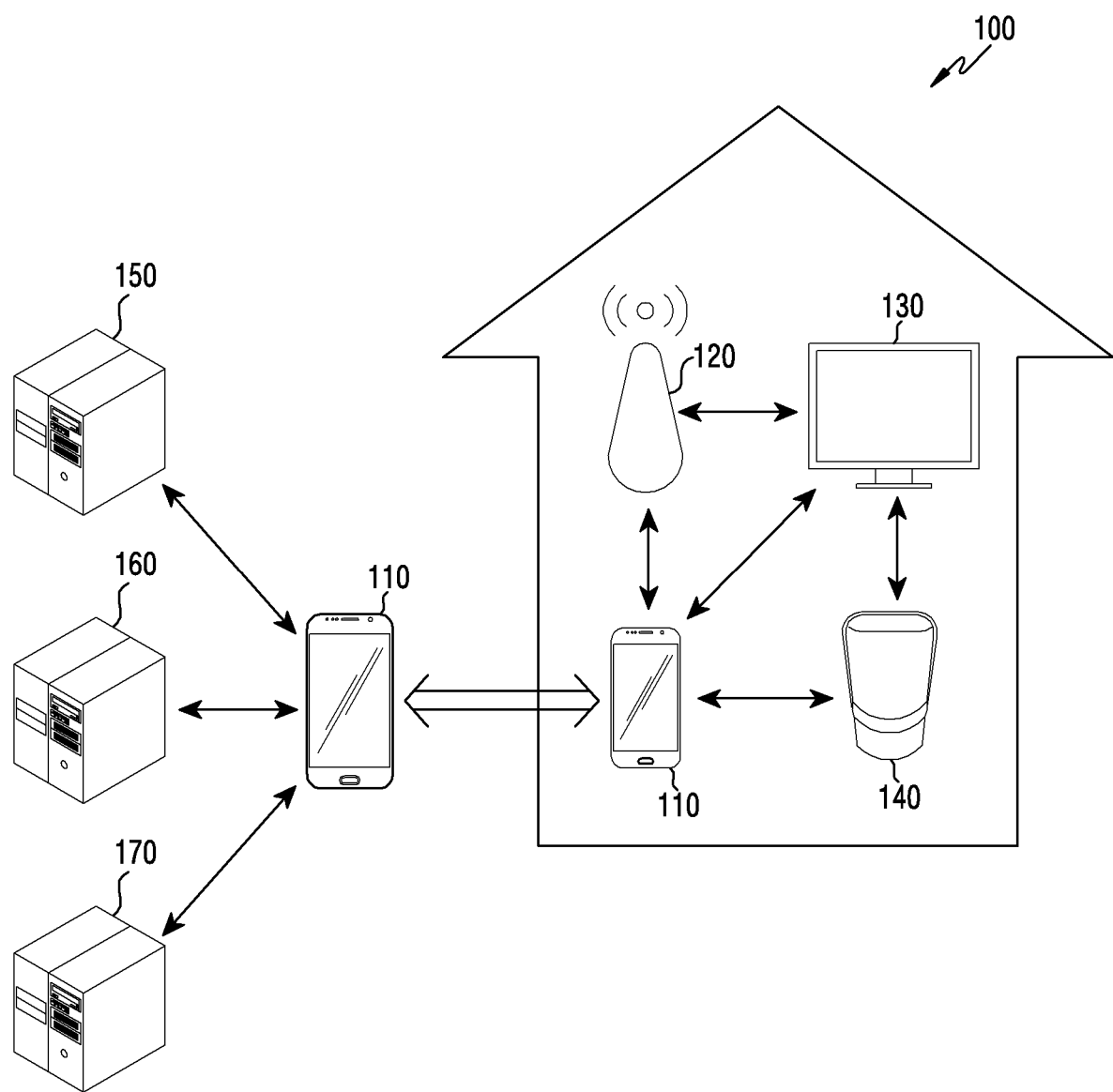
FIG. 1 is an illustration of an environment including an electronic device according to an embodiment.

FIG. 1 is an illustration of an environment 100 including an electronic device according to an embodiment.

Referring to FIG. 1, the environment 100 may include an electronic device 110, an access point (AP) 120, a first external electronic device 130, a second external electronic device 140, a first server 150, a second server 160, and a third server 170.

In an embodiment, the electronic device 110 may be a device having mobility or portability. For example, the electronic device 110 may be a mobile phone, a smart phone, a music player, a portable game console, a navigation system, a laptop computer, etc. The electronic device 110 may refer to a user equipment (UE), a mobile station, a portable terminal, a station (STA), a user device, etc.

In an embodiment, the electronic device 110 may be carried by a user, and may be moved by the user who carries the electronic device 110. For example, the electronic device 110 may be moved to an area (e.g., a house) with an IoT device (e.g., the first external electronic device 130 and/or the second external electronic device 140) by the user who carries the electronic device 110 and may be moved from the area with the IoT device to an external area.

In an embodiment, the electronic device 110 may reproduce multimedia content. For example, the electronic device 110 may reproduce multimedia content stored in the electronic device 110. For example, the electronic device 110 may reproduce multimedia content based on a streaming service provided from the first server 150 located outside the electronic device 110. To receive the streaming service from the first server 150, the electronic device 110 may use a first user account registered in the first server 150. For example, for the sake of the streaming service, the electronic device 110 may access the first server 150 through a first application installed in the electronic device 110 by using the first user account, and the first server 150 may, based on the electronic device 110 accessing the first server 150, provide the streaming service to the electronic device 110.

In an embodiment, to provide an IoT service, the electronic device 110 may be interlocked with an IoT device (e.g., the first external electronic device 130 and/or the second external electronic device 140). The electronic device 110 may be connected with the IoT device through the AP 120. The electronic device 110 may be connected with the IoT device through a direct communication path between the IoT device and the electronic device 110. The electronic device 110 may receive an IoT service from the second server 160. The second server 160 may be used to manage a connection between the electronic device 110 and the IoT device. For example, the second server 160 may obtain information about a connection state between the electronic device 110 and the AP 120 from the AP 120 or the electronic device 110, and, based on the obtained information, provide the information about the connection state in a user interface of a second application for the IoT service displayed through a display of the electronic device 110. By confirming the user interface of the second application, a user may identify the connection state between the electronic device 110 and the IoT device. For example, the second server 160 may obtain the information about the connection state between the IoT device and the AP 120 from the AP 120 or the IoT device, and, based on the obtained information, provide the information about the connection state in the user interface of the second application installed in the IoT device. In order for the second server 160 to provide the IoT service, a second user account may be registered in the second server 160. The electronic device 110 and the IoT device may share the second user account. The second server 160 may store data indicating that the IoT device is a device supporting the continuous reproduction of the first server 150. For example, the second server 160 may store a list of the first server 150 supporting the continuous reproduction and a list of IoT devices, in order to indicate that the IoT device is an IoT device supporting the first server 150 among IoT devices connected through the second user in the electronic device 110.

The second user account may be registered in, and be managed by, the third server 170. For example, the third server 170 may receive a request related with the second user account from the second server 160 for providing the IoT service to the electronic device 110 or the IoT device. For example, the third server 170 may store information about the second user account as associated with information about the first user account, in order for the IoT device to continuously reproduce the multimedia content which the electronic device 110 has reproduced based on the streaming service provided from the first server 150. On the other hand, the first server 150 may store the information about the first user account as associated with the information about the second user account, in order for the IoT device to continuously reproduce the multimedia content which the electronic device 110 has reproduced based on the streaming service provided from the first server 150. Based on the association between the first user account and the second user account, the IoT device may continuously reproduce, with the first user account, the multimedia content which the electronic device 110 has reproduced based on the streaming service provided from the first server 150.

The second server 160 and the third server 170 may be managed as a single server.

The electronic device 110 may perform operations for identifying that the electronic device 110 enters an area with an IoT device by communicating with at least one of the AP 120, the first external electronic device 130, the second external electronic device 140, the first server 150, the second server 160, and the third server 170, and, based on the identifying that the electronic device 110 enters an area with an IoT device, displaying a notification message for allowing the IoT device to continuously reproduce multimedia content which has been reproduced in the electronic device 110, and, based on an input to the notification message, continuously reproducing the multimedia content in the IoT device.

Figure 2:
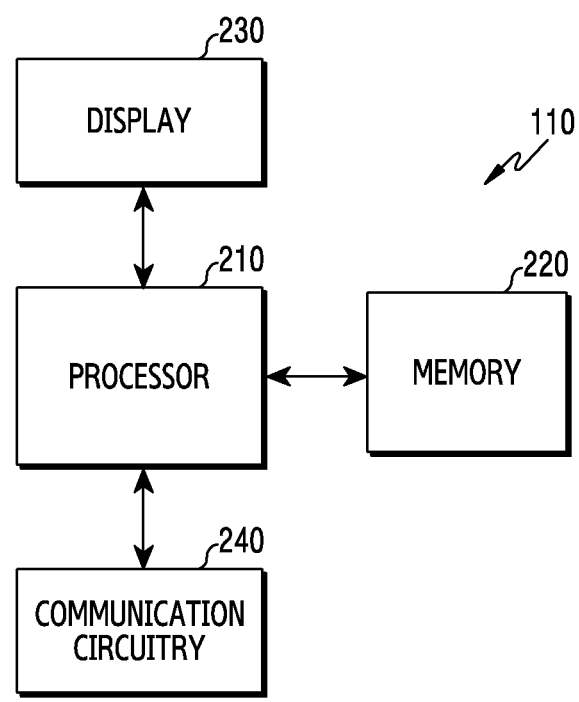
FIG. 2 is a block diagram of an electronic device according to an embodiment.

FIG. 2 is a block diagram of the electronic device 110 illustrated in FIG. 1.

Referring to FIG. 2, the electronic device 110 may include a processor 210, a memory 220, a display 230, and communication circuitry 240.

The processor 210 may control general operations of the electronic device 110. For example, the processor 210 may send or receive a signal through the communication circuitry 240. The processor 210 may record data in the memory 220, and read data recorded in the memory 220. The processor 210 may include a plurality of processors. For example, the processor 210 may include an application processor controlling an upper layer such as an application program, etc., a communication processor (CP) performing control for communication, a display controller for controlling a screen displayed on the display 230, etc.

The processor 210 may be configured to implement a procedure and/or a method disclosed in the present disclosure.

The memory 220 may store an instruction, a control command code, control data, or user data controlling the electronic device 110. For example, the memory 220 may store an application, an operating system (OS), middleware, and/or a device driver.

The memory 220 may include at least one or more of a volatile memory or a non-volatile memory. The volatile memory may include a dynamic random access memory (DRAM), a static random access memory (SRAM), a synchronous DRAM (SDRAM), a phase-change random access memory (PRAM), a magnetic random access memory (MRAM), a resistive random access memory (RRAM), a ferroelectric random access memory (FRAM), etc. The non-volatile memory may include a read only memory (ROM), a programmable ROM (PROM), an electrically programmable ROM (EPROM), an electrically erasable ROM (EEROM), a flash memory, etc.

The memory 220 may further include a non-volatile media such as a hard disk drive (HDD), a solid state disk (SSD), an embedded multimedia card (eMMC), and/or a universal flash storage (UFS) device.

The memory 220 may be operably or operatively coupled with the processor 210.

The display 230 may be a liquid crystal display (LCD) or a light emitting diode (LED) display. The display 230 may display various types of information (for example, multimedia, text data, etc.) to a user. For example, the display 230 may display a graphical user interface (GUI), wherein a user may interact with the electronic device 110.

The display 230 may be implemented in various forms. For example, the display 230 may be implemented as multiple displays including a plurality of displays. For example, the display 230 may be implemented as an edge display which includes a planar portion and at least one curved portion extending from the planar portion. For example, the display 230 may be implemented as a foldable display. However, the present disclosure is not limited thereto.

To receive a touch input, the display 230 may be implemented as a touch screen. For example, the touch input may include at least one of a single tap input, a double tap input, a hovering input, a hold and release input, and a drag and drop input.

The display 230 may be operatively coupled with the processor 210.

The communication circuitry 240 may provide various communication functions (for example, cellular communication, Bluetooth, near field communication (NFC), wireless fidelity (Wi-Fi), etc.) for communication between the electronic device 110 and at least one external device e.g., the AP 120, the first external electronic device 130, the second external electronic device 140, the first server 150, the second server 160, the third server 170, etc. In other words, the communication circuitry 240 may establish communication between the electronic device 110 and the at least one external device.

The communication circuitry 240 may be operatively coupled with the processor 210.

By using at least one of the memory 220, the display 230 or the communication circuitry 240 under the control of the processor 210, the electronic device 110 may perform operations for identifying that the electronic device 110 enters an area with an IoT device (e.g., the first external electronic device 130, the second external electronic device 140, etc.), and, based on identifying that the electronic device 110 enters an area with an IoT device, displaying a notification message for allowing the IoT device to continuously reproduce multimedia content which has been reproduced in the electronic device 110, and, based on an input to the notification message, continuously reproducing the multimedia content in the IoT device.

An electronic device may include a memory storing instructions, at least one communication circuitry, at least one display, and at least one processor. The at least one processor may be configured to, when executing the instructions, reproduce multimedia content in the electronic device, identify, through the at least one communication circuitry, whether the electronic device is connectable with an external electronic device interlocked with the electronic device, before a first time elapses from a time of initiating the reproduction of the multimedia content, and superimpose and display, on a screen which is being displayed through the at least one display, a visual object indicating that the external electronic device is able to continuously reproduce the multimedia content from a time at which the reproduction of the multimedia content has been progressed in the electronic device, based on identifying whether the electronic device is connectable with the external electronic device interlocked with the electronic device.

The at least one processor may be further configured to, when executing the instructions, while displaying the visual object through the at least one display, receive a user input to an object included in the visual object and displayed, in order to allow the external electronic device to continuously reproduce the multimedia content, and, in response to receiving the user input, send a message requesting the external electronic device to continuously reproduce the multimedia content, to a server (e.g. the server 160) interlocked with the external electronic device and the electronic device. The message sent to the server may include data about a user account of a first application which is used to reproduce the multimedia content in the electronic device, and data about a user account of a second application which is used to identify whether the electronic device is connectable with the external electronic device.

The at least one processor may be configured to, when executing the instructions, reproduce the multimedia content in the electronic device by using a first application, identify whether the electronic device is connectable with the external electronic device interlocked with the electronic device by using a second application distinguished from the first application, before the first time elapses from a time of initiating the reproduction of the multimedia content, and display the visual object by using the second application, based on identifying whether the electronic device is connectable with the external electronic device interlocked with the electronic device.

The at least one processor may be configured to, when executing the instructions, while reproducing the multimedia content in the electronic device, receive an input for stopping the reproduction of the multimedia content in the electronic device, and identify whether the electronic device is connectable with the external electronic device, before a specified time elapses from a time of receiving the input.

The at least one processor may be configured to, when executing the instructions, while reproducing the multimedia content in the electronic device, identify whether the electronic device is connectable with the external electronic device.

The at least one processor may be configured to, when executing the instructions, identify whether the electronic device is connectable with a plurality of external electronic devices interlocked with the electronic device, before the first time elapses from a time of initiating the reproduction of the multimedia content, and, in response to identifying whether the electronic device is connectable with the plurality of external electronic devices, identify the external electronic device corresponding to the type of the multimedia content among the plurality of external electronic devices, and, in response to identifying whether the external electronic device is connectable with the plurality of external electronic devices interlocked with the electronic device, display the visual object through the at least one display.

The at least one processor may be configured to, when executing the instructions, identify whether the electronic device is connectable with a plurality of external electronic devices interlocked with the electronic device, before the first time elapses from a time of initiating the reproduction of the multimedia content, and, in response to identifying whether the electronic device is connectable with the plurality of external electronic devices, identify the external electronic device located in a place closest to the electronic device among the plurality of external electronic devices, and, in response to identifying that the external electronic device is located in the place closest to the electronic device among the plurality of external electronic devices, display the visual object through the at least one display.

The at least one processor may be configured to, when executing the instructions, identify whether the electronic device is connectable with a plurality of external electronic devices interlocked with the electronic device, before the first time elapses from a time of initiating the reproduction of the multimedia content, and, in response to identifying whether the electronic device is connectable with the plurality of external electronic devices, identify the external electronic device corresponding to a context of the multimedia content obtained based on recognizing the multimedia content among the plurality of external electronic devices, and, in response to identifying that the external electronic device corresponds to the context of the multimedia content, display the visual object through the at least one display. Recognizing the multimedia content may be performed by recognizing at least one keyword included in the multimedia content or may be performed based on metadata of the multimedia content.

An electronic device may include a memory storing instructions, at least one communication circuitry, and at least one processor. The at least one processor is configured to, when executing the instructions, reproduce multimedia content in the electronic device, and identify, through the at least one communication circuitry, whether the electronic device is connectable with an external electronic device interlocked with the electronic device, before a first time elapses from a time of initiating the reproduction of the multimedia content, and send, to the external electronic device through the at least one communication circuitry, a request message requesting the external electronic device to provide a notification indicating that the external electronic device is able to continuously reproduce the multimedia content from a time at which the reproduction of the multimedia content has been progressed in the electronic device, based on identifying whether the electronic device is connectable with the external electronic device interlocked with the electronic device.

The electronic device may further include a display. The at least one processor may be further configured to, when executing the instructions, receive a response message responsive to the request message from the external electronic device through the at least one communication circuitry, and identify whether the external electronic device is allowed to continuously reproduce the multimedia content, in the response message, and, in response to identifying that the external electronic device is allowed to continuously reproduce the multimedia content, display, through the display, a user interface including at least one executable object for controlling the multimedia content which is being continuously reproduced in the external electronic device. The at least one processor may be further configured to, when executing the instructions, receive a user input to the at least one executable object, and, in response to the receiving of the user input, send, to the external electronic device through the at least one communication circuitry, a control message for controlling the multimedia content which is being continuously reproduced in the external electronic device.

The at least one processor may be configured to, when executing the instructions, identify whether the electronic device is connectable with a plurality of external electronic devices interlocked with the electronic device, before the first time elapses from a time of initiating the reproduction of the multimedia content, and, in response to identifying whether the electronic device is connectable with the plurality of external electronic devices, identify the external electronic device corresponding to a current time among the plurality of external electronic devices, and, in response to identifying that the external electronic device corresponds to the current time among the plurality of external electronic devices, send the request message to the external electronic device. The at least one processor may be configured to, when executing the instructions, obtain information on a history of use of each of the plurality of external electronic devices, and identify the external electronic device corresponding to the current time among the plurality of external electronic devices, based on the information on the history of use.

An electronic device may include a memory storing instructions, at least one communication circuitry, at least one display, and at least one processor. The at least one processor may be configured to, when executing the instructions, identify, through the at least one communication circuitry, that a connection with an external electronic device which is reproducing multimedia content is released, and receive, through the at least one communication circuitry, a message for displaying a visual object indicating that the electronic device is able to continuously reproduce the multimedia content from a time at which the reproduction of the multimedia content has been progressed in the external electronic device, before a first time elapses from the identifying, and, in response to the receiving, superimpose and display the visual object on a screen which is being displayed through the at least one display.

The at least one processor may be further configured to, when executing the instructions, while displaying the visual object through the at least one display, receive a user input to an object included in the visual object and displayed, in order to allow the electronic device to continuously reproduce the multimedia content, and, in response to the receiving of the user input, send a request message requesting the electronic device to continuously reproduce the multimedia content, to a server (e.g., the second server 160) interlocked with the external electronic device and the electronic device. The at least one processor may be configured to, when executing the instructions, in response to the request message, receive a response message for continuously reproducing the multimedia content from the server, and continuously reproduce the multimedia content by using a second application distinguished from a first application which is used to identify that the connection with the external electronic device is released, based on the response message.

The message may include information on a time at which the reproduction of the multimedia content has been progressed in the external electronic device.

The at least one communication circuitry may include a first communication circuitry configured to support a first communication technique, and a second communication circuitry configured to support a second communication technique distinguished from the first communication technique. The at least one processor may be configured to, when executing the instructions, identify that the connection with the external electronic device is released, through the first communication circuitry, and receive the message for displaying the visual object, through the second communication circuitry.

Figure 3:
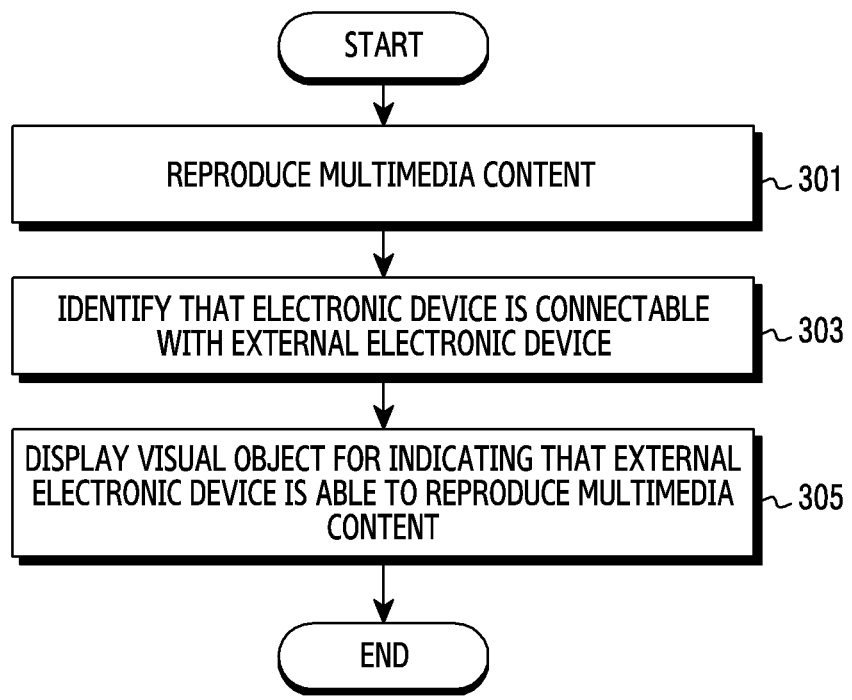
FIG. 3 is a flowchart of a method of an electronic device according to an embodiment.

FIG. 3 is a flowchart of a method of an electronic device according to an embodiment. The method may be performed by the electronic device 110, or the processor 210 included in the electronic device 110.

Figure 4:
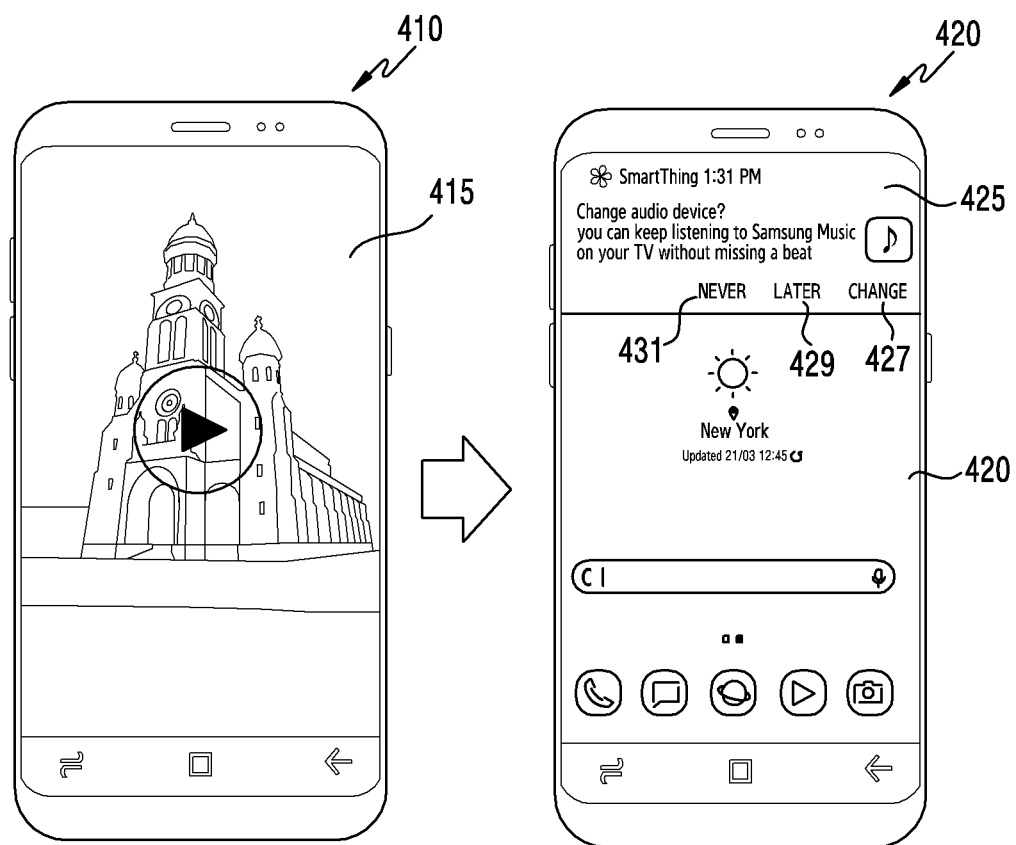
FIG. 4 is an illustration of a screen displayed in a display of an electronic device according to an embodiment.

FIG. 4 is an illustration of a screen displayed in a display of an electronic device of an embodiment.

Referring to FIG. 3, in step 301, the processor 210 may reproduce multimedia content in the electronic device 110. The type of the multimedia content may include at least one of a text, music, a moving picture, or a still picture. To reproduce the multimedia content, the processor 210 may use a first application installed in the electronic device 110. While reproducing the multimedia content by using the first application, the processor 210 may display a user interface of the first application by using the display 230. For example, referring to FIG. 4, as in a state 410, while reproducing the multimedia content, the processor 210 may display a user interface 415 of the first application. The processor 210 may reproduce the multimedia content by using a file (e.g., an audio file and/or a video file) stored in the electronic device 110. The processor 210 may reproduce the multimedia content, based on a streaming service provided from the first server 150. For example, the processor 210 may access the first server 150 through the first user account defined above with reference to FIG. 1 by using the first application, and, based on accessing the first server 150 through the first user account, reproduce the multimedia content through the streaming service provided from the first server 150.

In step 303, the processor 210 may identify that the electronic device 110 is connectable with an external electronic device. For example, the processor 210 may identify that the electronic device 110 is pairable with the external electronic device. The processor 210 may identify that the electronic device 110 is pairable with the external electronic device (e.g., the first external electronic device 130 and/or the second external electronic device 140) interlocked with the electronic device 110, before a first time elapses from a time of initiating the reproduction of the multimedia content. Below, the first external electronic device 130 may be referred to as the external electronic device 130. For example, the processor 210 may identify that the electronic device 110 is pairable with the external electronic device 130 interlocked with the electronic device 110, before a specified time elapses from a time of stopping reproducing the multimedia content. For example, while reproducing the multimedia content, the processor 210 may identify that the electronic device 110 is pairable with the external electronic device 130 interlocked with the electronic device 110. However, the present disclosure is not limited thereto. After identifying that the electronic device 110 is connectable with the external electronic device, the processor 210 may identify whether the external electronic device is a device capable of continuously reproducing the multimedia content. The processor 210 may identify that the electronic device 110 enters an environment with an IoT device, through identifying whether the external electronic device is a device capable of continuously reproducing the multimedia content.

Alternatively, the processor 210 may identify that the electronic device 110 enters the environment with the IoT device, by identifying that the electronic device 110 is pairable with the AP 120 instead of the external electronic device 130, before a first time elapses from a time of initiating the reproduction of the multimedia content. Alternatively, the processor 210 may identify that the electronic device 110 enters the environment with the IoT device, by providing a state of the electronic device 110, before the first time elapses from the time of initiating the reproduction of the multimedia content. For example, the processor 210 may identify that the electronic device 110 enters the environment with the IoT device, by providing the use of an electronic key which is stored in the electronic device 110 and which is for releasing a door lock of a house. However, the present disclosure is not limited thereto.

In step 305, the processor 210 may display a visual object for indicating that the external electronic device 130 is able to continuously reproduce the multimedia content. The visual object may be configured with a notification message. The visual object may be displayed in response to converting the display 230 from an inactive state to an active state. The visual object may be displayed through the display 230 by a second application distinguished from the first application. The visual object may be replaced with a feedback having another type. For example, instead of displaying the visual object through the display 230, the processor 210 may output, through a speaker, a voice signal for indicating that the external electronic device 130 is able to continuously reproduce the multimedia content, or provide a tactile indication for indicating that the external electronic device 130 is able to continuously reproduce the multimedia content. Based on identifying that the electronic device 110 is pairable with the external electronic device 130, the processor 210 may display, through the display 230, the visual object which is superimposed on a screen displayed through the display 230 and which is for indicating that the external electronic device 130 is able to continuously reproduce the multimedia content, from a time at which the reproduction of the multimedia content has been progressed in the electronic device 110. For example, referring to FIG. 4, as in a state 420, the processor 210 may display a notification message 425 superimposed on a wall paper 420. The notification message 425 may include at least one text for indicating that the external electronic device 130 is able to continuously reproduce the multimedia content. The notification message 425 may include at least one of a visual object 427 for allowing the external electronic device 130 to continuously reproduce the multimedia content, an object 429 for delaying, a specified time later, identifying whether to continuously reproduce the multimedia content in the external electronic device 130, or an object 431 for rejecting continuously reproducing the multimedia content in the external electronic device 130. A screen disposed under the notification message 425 may become different depending on a use state of the electronic device 110. For example, the notification message 425 may be superimposed on a lock screen. For example, the notification message 425 may be superimposed on a user interface of the first application. For example, the notification message 425 may be superimposed on another application distinguished from the first application. However, the present disclosure is not limited thereto. The notification message 425 may be displayed in a quick panel which is displayed based on a drag input of going from a side area of the display 230 to another area of the display 230.

The processor 210 may perform various operations, based on an input to an object among objects included in the notification message 425. For example, in response to receiving an input to the object 427, the processor 210 may perform operations for continuously reproducing the multimedia content in the external electronic device 130. For example, in response to receiving an input to the object 429, the processor 210 may identify displaying the notification message 425 after a specified time, and again display the notification message 425 through the display 230 after the specified time elapses from a time of receiving the input to the object 429. For example, in response to receiving an input to the object 431, the processor 210 may stop a process for continuously reproducing the multimedia content in the external electronic device 130. However, the present disclosure is not limited thereto.

As described above, the electronic device 110 may display a notification message, based on the electronic device 110 identifying that the external electronic device 130 distinguished from the electronic device 110 is able to continuously reproduce multimedia content which has been reproduced in the electronic device 110. Based on an input to the notification message, the electronic device 110 may perform operations for continuously reproducing the multimedia content in the external electronic device 130. In other words, by using the notification message, the electronic device 110 may bypass inputs required for continuously reproducing the multimedia content in the external electronic device 130 (e.g., an input required for executing the first application in the external electronic device 130, an input required for reproducing the multimedia content in a user interface of the first application displayed in the external electronic device 130, etc.). In other words, the electronic device 110 may provide an intuitive UX through the notification message.

Figure 5:
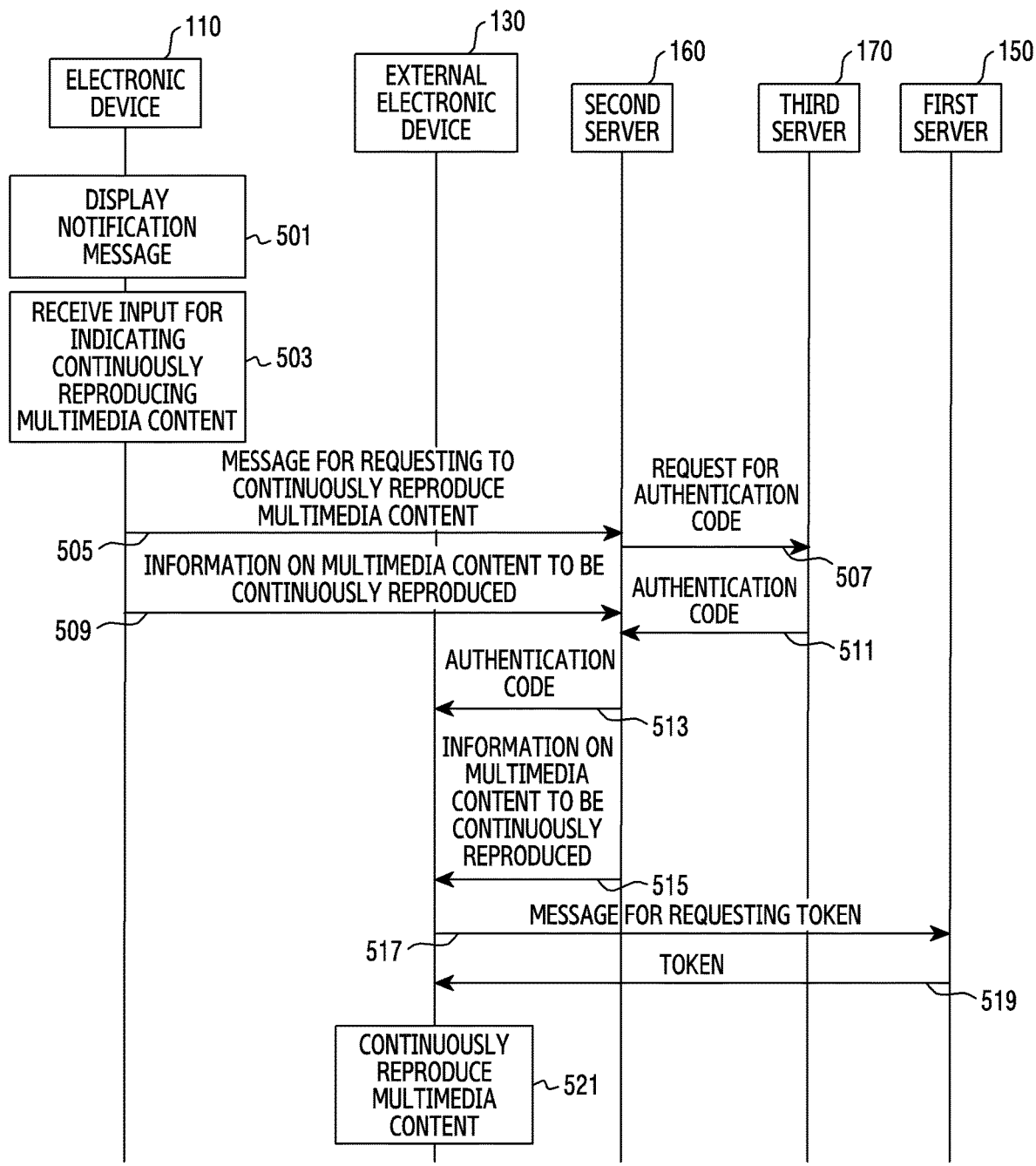
FIG. 5 is a flow diagram of an electronic device and other electronic devices for continuously reproducing multimedia content in an external electronic device according to an embodiment.

FIG. 5 is a flow diagram of an electronic device and other electronic devices for continuously reproducing multimedia content in an external electronic device according to an embodiment. The flow diagram may be performed by the electronic device 110, the external electronic device 130, the first server 150, the second server 160, and the third server 170.

Referring to FIG. 5, in step 501, the electronic device 110 may display a notification message 425, shown in FIG. 4, for indicating that the external electronic device 130 is able to continuously reproduce the multimedia content from a time at which the reproduction of the multimedia content has been progressed in the electronic device 110. Step 501 may correspond to step 305 illustrated in FIG. 3.

In step 503, while displaying the notification message, the electronic device 110 may receive an input for indicating continuously reproducing the multimedia content. For example, referring to FIG. 4, the electronic device 110 may receive an input to the object 427 included in the notification message 425.

In step 505, in response to receiving the input, the electronic device 110 may directly send the second server 160 a message for requesting continuously reproducing the multimedia content in the external electronic device 130, or send the second server 160 the message through the AP 120. The electronic device 110 may send the second server 160 the message, by using the second application for managing a connection between the electronic device 110 and the external electronic device 130. The message may be used to request for providing the external electronic device 130 with an authentication code for continuously reproducing the multimedia content in the external electronic device 130. The second server 160 may receive the message from the electronic device 110.

In step 507, the second server 160 may request an authentication code from the third server 170. The authentication code may be used to receive the issuance of a token that will be used in the first server 150 for providing a streaming service of the multimedia content. The third server 170 may receive the request for the authentication code from the second server 160.

On the other hand, in step 509, the electronic device 110 may directly send the second server 160 information about the multimedia content that will be continuously reproduced in the external electronic device 130, or send the second server 160 the information through the AP 120. FIG. 5 illustrates an example of performing step 509 after performing step 505, but step 505 and step 509 may be performed inversely and may be performed concurrently.

On the other hand, in step 511, the third server 170 may send the authentication code to the second server 160, based on receiving the request for the authentication code. For example, the third server 170 may receive the request for the authentication code, in a state of storing information about the second user account which is stored in the third server 170 and which is used in the electronic device 110 and the external electronic device 130. The information about the second user account may include a globally unique identifier (GUID) of the second user account. The information about the second user account may be stored in the third server 170 as associated with information about the first user account for accessing the first server 150. The information about the first user account may include a GUID of the first user account. In response to receiving the request, the third server 170 may obtain the authentication code for receiving, by the external electronic device 130, the issuance of the token for continuously reproducing the multimedia content in the external electronic device 130 by accessing the first server 150 by using the first user account associated with the second user account, and provide the authentication code to the second server 160. The second server 160 may receive the authentication code.

In step 513, the second server 160 may send the external electronic device 130 the authentication code provided from the third server 170. The external electronic device 130 may receive the authentication code from the second server 160. For example, the external electronic device 130 may receive the authentication code by using the second application installed in the external electronic device 130.

In step 515, the second server 160 may provide the information received in step 509, to the external electronic device 130. For example, the second server 160 may provide the information to the external electronic device 130 wherein the external electronic device 130 may specify what the multimedia content is, and specify a time at which the reproduction of the multimedia content has been progressed in the electronic device 110. The external electronic device 130 may receive the information from the second server 160. For example, the external electronic device 130 may receive the information by using the second application.

FIG. 5 illustrates an example of performing step 515 after performing step 513, but step 513 and step 515 may be performed inversely and may be performed concurrently.

In step 517, the external electronic device 130 may send the first server 150 a message for requesting the token, by using at least one of the authentication code received from the second server 513 and the information received from the second server 513. For example, the external electronic device 130 may access the first server 150 by using the authentication code received from the second server 513. Sending the message may be performed by the second application. On the other hand, the first server 150 may receive the message from the external electronic device 130. The first server 150 may receive the message from the external electronic device 130, in a state of storing the information about the first user account (e.g., the GUID of the first user account) stored as associated with the information about the second user account (e.g., the GUID of the second user account). In response to receiving the message, the first server 150 may identify that the information about the first user account is associated with the information about the second user account, based on the authentication code. In response to receiving the message, the first server 150 may authenticate the external electronic device 130, based on the authentication code. Based on the message, the first server 150 may obtain or provide the token for continuously reproducing the multimedia content in the external electronic device 130 from a time at which the reproduction of the multimedia content has been progressed in the electronic device 110.

In step 519, the first server 150 may send the token to the external electronic device 130. The external electronic device 130 may receive the token from the external electronic device 130.

In step 521, by using the token, the external electronic device 130 may continuously reproduce the multimedia content in the external electronic device 130 from the time at which the reproduction of the multimedia content has been progressed in the electronic device 110.

Step 505 to step 519 are performed through signaling of the electronic device 110, the external electronic device 160, the first server 150, the second server 160, and the third server 170, thus, step 505 to step 519 may be transparent to a user. In other words, as in step 503, the electronic device 110 may provide a service of continuously reproducing the multimedia content in the external electronic device 130 from a time at which the reproduction of the multimedia content has been progressed in the electronic device 110, through an intuitive input to an object included in the notification message. In other words, the electronic device 110 may provide an enhanced UX.

FIG. 5 exemplifies operations of continuously reproducing the multimedia content in the external electronic device 130 by using a streaming service, but the electronic device 110 may continuously reproduce the multimedia content in the external electronic device 130 through mirroring to the external electronic device 130. For example, in response to receiving (e.g., step 503) an input of indicating that the external electronic device 130 continuously reproduces the multimedia content, the electronic device 110 may execute the first application for reproducing the multimedia content in the electronic device 110, and send the external electronic device 130 information provided from the first application. The external electronic device 130 may continuously reproduce the multimedia content, based on the information received from the electronic device 110. Executing the first application, sending the information, and receiving the information may be progressed on a background. In other words, executing the first application, sending the information, and receiving the information may be transparent to a user. In other words, the electronic device 110 may provide a service of continuously reproducing the multimedia content in the external electronic device 130 from a time at which the reproduction of the multimedia content has been progressed in the electronic device 110, through an intuitive input to an object included in the notification message. In other words, the electronic device 110 may provide an enhanced UX.

Figure 6:
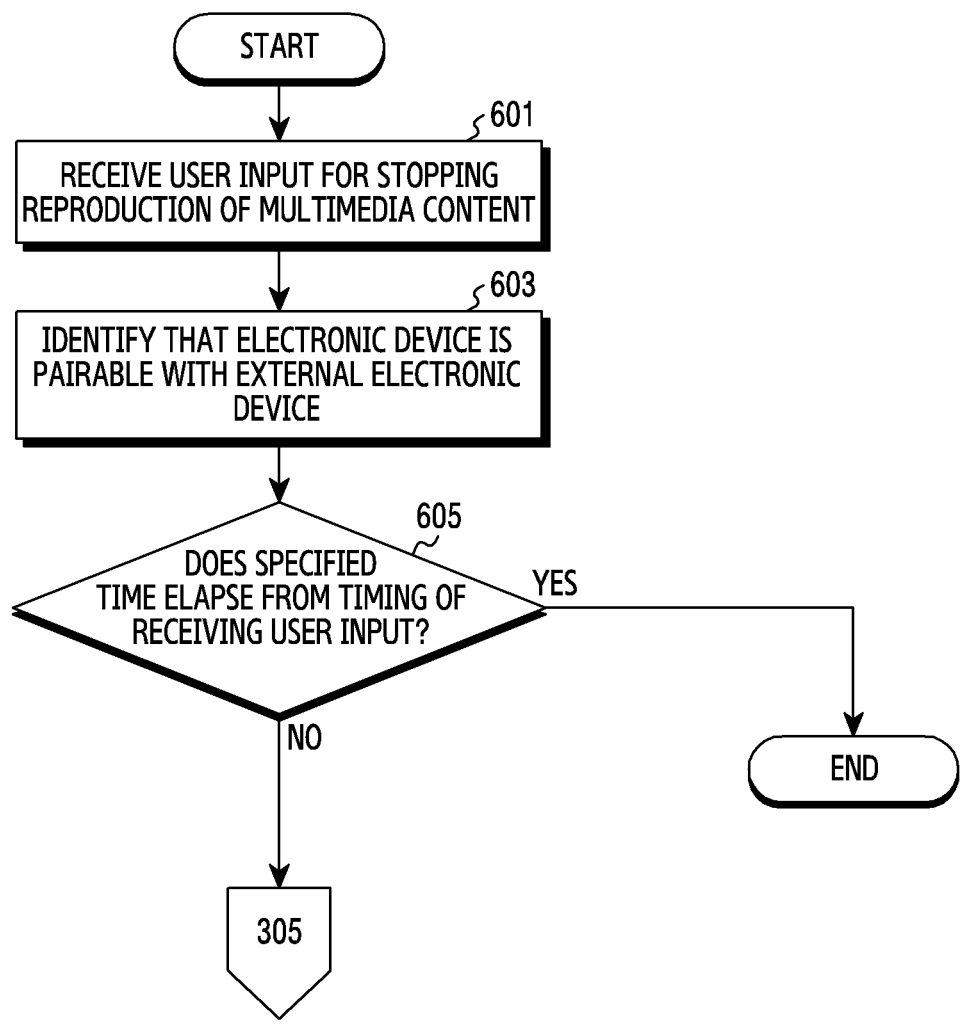
FIG. 6 is a flowchart of a method of an electronic device for identifying whether to display a notification message according to an embodiment.

FIG. 6 is a flowchart of a method of an electronic device for identifying whether to display a notification message according to an embodiment. The method may be performed by the electronic device 110 or the processor 210 included in the electronic device 110.

Referring to FIG. 6, steps 601, 603, and 605 may relate to step 303 of FIG. 3.

In step 601, while reproducing the multimedia content by using the first application, the processor 210 may receive an input for stopping the reproduction of the multimedia content. For example, the processor 210 may receive an input to an object (e.g., a stop button, a pause button, etc.) included in a user interface of the first application displayed while the multimedia content is displayed, or receive an input for stopping the execution of the first application.

In step 603, after receiving the input, the processor 210 may identify that the electronic device 110 is pairable with the external electronic device 130. For example, the processor 210 may identify that the electronic device 110 is pairable with the external electronic device 130, based on identifying that the electronic device 110 accesses the same AP 120 as the external electronic device 130. For example, the processor 210 may identify that the electronic device 110 is pairable with the external electronic device 130, based on information received from the second server 160. For example, the processor 210 may identify that the electronic device 110 is pairable with the external electronic device 130, based on a use state of the electronic device 110. However, the present disclosure is not limited thereto.

In step 605, the processor 210 may identify whether a specified time elapses from a time of receiving the input, based on identifying that the electronic device 110 is pairable with the external electronic device 130. The specified time may be altered according to a user setting. The specified time may be set by a system application of the electronic device 110. The specified time may be previously identified. The specified time may be configured in the electronic device 110 in order to check whether it is a state in which it is required that the external electronic device 130 continuously reproduces the multimedia content. Based on identifying that the specified time elapses from the time of receiving the input, the processor 210 may stop a process for continuously reproducing the multimedia content in the external electronic device 130. Based on identifying that the specified time does not elapse from the time of receiving the input, the processor 210 may perform step 305 in order to inquire whether to continuously reproduce the multimedia content in the external electronic device 130.

Alternatively, instead of identifying whether the specified time elapses from the time of receiving the input, the processor 210 may identify a time duration from the time of receiving the input to a time of identifying that the electronic device 110 is pairable with the external electronic device, and identify whether the time duration is shorter than a specified time duration. In other words, various methods for identifying whether to display the notification message may be applied in the electronic device 110.

As described above, the electronic device 110 may identify whether it is required that the external electronic device 130 continuously reproduces the multimedia content, by using a timer. The electronic device 110 of the present disclosure may enhance a user's convenience through the identifying.

Figure 7:
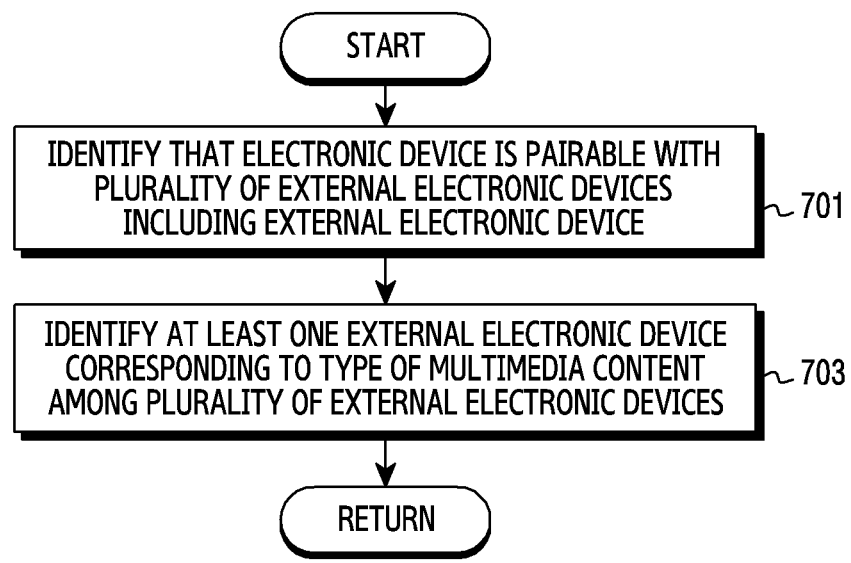
FIG. 7 is a flowchart of a method of an electronic device for identifying an external electronic device according to an embodiment.

FIG. 7 is a flowchart of a method of an electronic device for identifying an external electronic device according to an embodiment. The method may be performed by the electronic device 110 or the processor 210 included in the electronic device 110.

Referring to FIG. 7, steps 701 and 703 may relate to step 303 of FIG. 3.

In step 701, the processor 210 may identify that the electronic device 110 is pairable with a plurality of external electronic devices including the external electronic device 130. Step 701 may correspond to step 303 of FIG. 3. For example, the processor 210 may identify that the electronic device 110 is pairable with the plurality of external electronic devices including the external electronic device 130, before a first time elapses from a time of initiating the reproduction of the multimedia content. The plurality of external electronic devices may indicate electronic devices accessing the AP 120. The plurality of external electronic devices may refer to electronic devices that are controlled using the second user account used by the electronic device 110. Step 701 may be performed through the second application.

In step 703, the processor 210 may identify at least one external electronic device corresponding to the type of the multimedia content among the plurality of external electronic devices. For example, the processor 210 may identify the at least one external electronic device corresponding to the type of the multimedia content, based on identifying that the electronic device 110 is pairable with the plurality of external electronic devices. For example, in response to identifying that the electronic device 110 is pairable with the plurality of external electronic devices, the processor 210 may identify whether the type of the multimedia content is multimedia content (e.g., a still picture, a moving picture, or a text) requiring the provision of visual information or is multimedia content (e.g., music) not requiring provision of visual information. For example, the processor 210 may identify whether the type of the multimedia content is multimedia content requiring provision of visual information or is multimedia content not requiring provision of visual information, based on the kind of a service provided by the first application which is used to reproduce the multimedia content. For example, the processor 210 may identify whether the type of the multimedia content is multimedia content requiring provision of visual information or is multimedia content not requiring provision of visual information, based on metadata of the multimedia content. However, the present disclosure is not limited thereto.

For example, in response to the multimedia content being multimedia content requiring provision of visual information, the processor 210 may identify, as the at least one external electronic device, an electronic device (e.g., a TV, a display of a refrigerator, a digital signboard, etc.) including a display capable of providing visual information among the plurality of external electronic devices. For example, in response to the multimedia content being music not requiring provision of visual information, the processor 210 may identify, as the at least one external electronic device, an electronic device capable of reproducing music among the plurality of external electronic devices.

In response to the number of the external electronic devices identified among the plurality of external electronic devices exceeding 1, the processor 210 may identify one external electronic device, based on the priority of the identified external electronic devices. For example, in response to the multimedia content being music, the processor 210 may identify, as the one external electronic device, a speaker having the highest priority among the external electronic devices identified among the plurality of external electronic devices.

In response to the number of the external electronic devices identified among the plurality of external electronic devices exceeding 1, the processor 210 may identify all of the identified external electronic devices as the at least one external electronic device. For example, in response to the multimedia content being a video, the processor 210 may identify a TV among the identified external electronic devices, as a device for reproducing a moving picture, and identify a speaker among the identified external electronic devices, as a device for outputting a sound of the moving picture.

As described above, by identifying at least one external electronic device according to the type of the multimedia content that will be continuously reproduced, the electronic device 110 may bypass receiving a user input for selecting the at least one external electronic device. In other words, by identifying the at least one external electronic device according to the type of the multimedia content, the electronic device 110 may decrease the number of inputs required to continuously reproduce the multimedia content.

Figure 8:
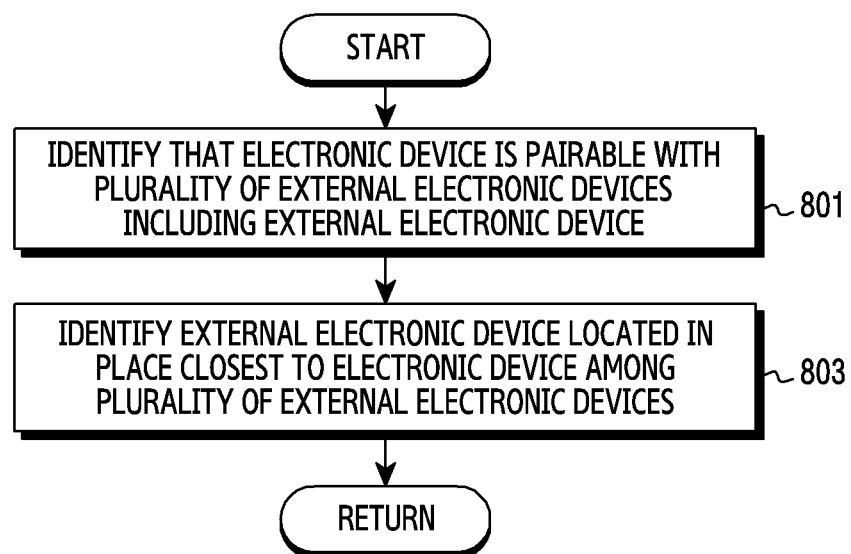
FIG. 8 is a flowchart of a method of an electronic device for identifying an external electronic device according to an embodiment.

FIG. 8 is a flowchart of a method of an electronic device for identifying an external electronic device according to an embodiment. This method may be performed by the electronic device 110 or the processor 210 included in the electronic device 110.

Referring to FIG. 8, steps 801 and 803 may relate to step 303 of FIG. 3.

In step 801, the processor 210 may identify that the electronic device 110 is pairable with a plurality of external electronic devices including the external electronic device 130. Step 801 may correspond to step 303 of FIG. 3 or step 701 of FIG. 7.

In step 803, the processor 210 may identify the external electronic device 130 located in a place closest to the electronic device 110 among the plurality of external electronic devices. For example, the processor 210 may obtain information on a received signal strength (RSS) of a signal received directly from each of the plurality of external electronic devices, by using the communication circuitry 240, and, based on the RSS, identify each distance between the plurality of external electronic devices and the electronic device 110, respectively. The processor 210 may identify the external electronic device 130 located in a place closest to the electronic device 110 among the plurality of external electronic devices, based on identifying the distances between the plurality of external electronic devices and the electronic device 110, respectively. For example, the processor 210 may obtain, from the AP 120, information about an RSS of a signal sent to the AP 120 from each of the plurality of external electronic devices and information about an RSS of a signal sent to the AP 120 from the electronic device 110. Based on the information obtained from the AP 120, the processor 210 may identify each location relationship between the plurality of external electronic devices and the electronic device 110, and, based on identifying the location relationships between the plurality of external electronic devices and the electronic device 110, identify the external electronic device 130 located in a place closest to the electronic device 110 among the plurality of external electronic devices. For example, based on the information about the RSS of the signal sent to the AP 120 from each of the plurality of external electronic devices and the information about the RSS of the signal sent to the AP 120 from the electronic device 110, the processor 210 may receive, from the AP 120, information about the location relations between the plurality of external electronic devices and the electronic device 110 identified by the AP 120, and based on the received information, identify the external electronic device 130 located in a place closest to the electronic device 110 among the plurality of external electronic devices. For example, by comparing a strength of a voice signal received by the electronic device 110 and a strength of a voice signal received by each of the plurality of external electronic devices at a time at which the electronic device 110 receives the voice signal, the processor 210 may identify the external electronic device 130 located in a place closest to the electronic device 110 among the plurality of external electronic devices. The information about the strength of the voice signal received by each of the plurality of external electronic devices may be received by the electronic device 110 from each of the plurality of external electronic devices through the AP 120, or be directly received by the electronic device 110 from each of the plurality of external electronic devices. However, the present disclosure is not limited thereto.

As described above, by identifying an external electronic device located in proximity to the electronic device 110 as an external electronic device continuously reproducing the multimedia content, the electronic device 110 may provide an enhanced convenience to a user.

Figure 9:
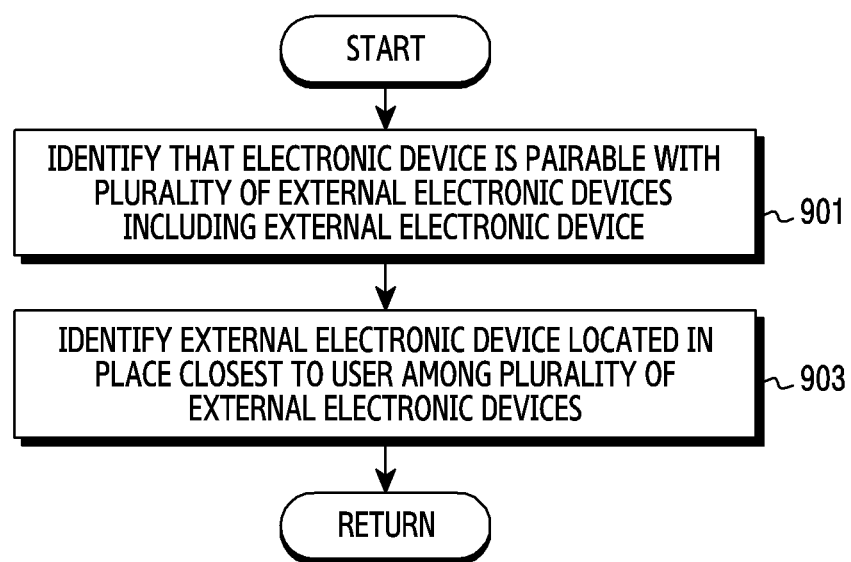
FIG. 9 is a flowchart of a method of an electronic device for identifying an external electronic device according to an embodiment.

FIG. 9 is a flowchart of a method of an electronic device for identifying an external electronic device according to an embodiment. The method may be performed by the electronic device 110 or the processor 210 included in the electronic device 110.

Referring to FIG. 9, steps 901 and 903 may relate to step 303 of FIG. 3.

In step 901, the processor 210 may identify that the electronic device 110 is pairable with a plurality of external electronic devices including the external electronic device 130. Step 901 may correspond to step 303 of FIG. 3 or step 701 of FIG. 7.

In step 903, the processor 210 may identify the external electronic device 130 located in a place closest to a user of the electronic device 110 among the plurality of external electronic devices. For example, the processor 210 may obtain information about distances between the user and each of the plurality of external electronic devices, by using the second application. For example, each of the plurality of external electronic devices may obtain a voice signal of the user by using a microphone of each of the plurality of external electronic devices, and provide information about a strength of the obtained voice signal to the electronic device 110 through the AP 120 by using the second application or directly provide the information to the electronic device 110. The processor 210 may obtain information about distances between the user and each of the plurality of external electronic devices, based on the information provided from each of the plurality of external electronic devices. For example, each of the plurality of external electronic devices may obtain an image including a visual object corresponding to the user by using a camera of each of the plurality of external electronic devices, and provide information about the image to the electronic device 110 through the AP 120 by using the second application or directly provide the information to the electronic device 110. The processor 210 may obtain information about distances between the user and each of the plurality of external electronic devices, based on the information provided from each of the plurality of external electronic devices. However, the present disclosure is not limited thereto. The processor 210 may identify the external electronic device 130 located in a place closest to the user among the plurality of external electronic devices, based on the information about the distances between the user and the plurality of external electronic devices.

As described above, the electronic device 110 may provide an enhanced convenience to a user of the electronic device 110, by identifying an external electronic device located in proximity to the user of the electronic device 110 as an external electronic device continuously reproducing multimedia content, in consideration of where the user of the electronic device 110 does not carry the electronic device 110.

Figure 10:
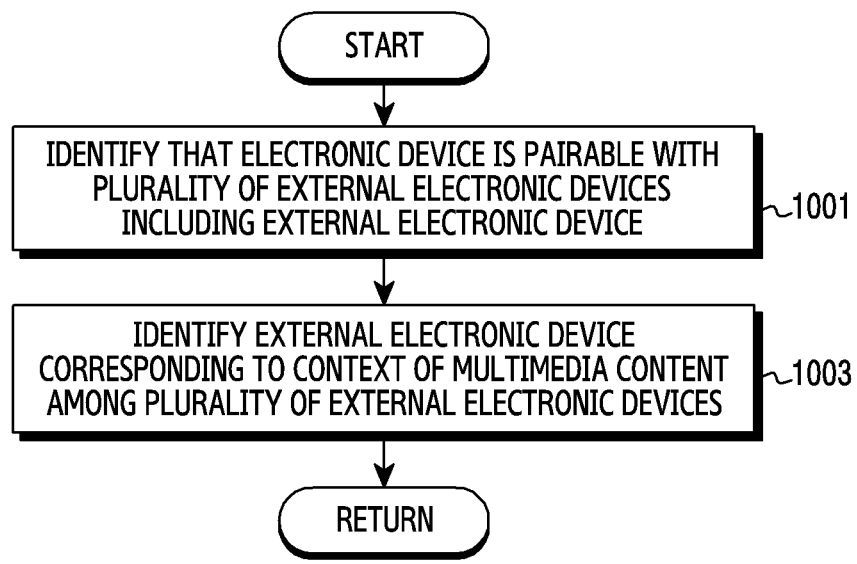
FIG. 10 is a flowchart of a method of an electronic device for identifying an external electronic device according to an embodiment.

FIG. 10 is a flowchart of a method of an electronic device for identifying an external electronic device according to an embodiment. The method may be performed by the electronic device 110 or the processor 210 included in the electronic device 110.

Referring to FIG. 10, in steps 1001 and 1003 may relate to step 303 of FIG. 3.

In step 1001, the processor 210 may identify that the electronic device 110 is pairable with a plurality of external electronic devices including the external electronic device 130. Step 1001 may correspond to step 303 of FIG. 3 or step 701 of FIG. 7.

In step 1003, the processor 210 may identify the external electronic device 130 corresponding to a context of multimedia content that will be continuously reproduced among the plurality of external electronic devices. For example, in response to identifying that the electronic device 110 is pairable with the plurality of external electronic devices, the processor 210 may identify the context of the multimedia content. For example, the processor 210 may identify the context of the multimedia content from elements (e.g., a text, a visual object, etc.) configuring the multimedia content. For example, the processor 210 may identify the context of the multimedia content from metadata of the multimedia content. For example, in response to the multimedia content having a context for providing a food recipe, the processor 210 may identify, as the external electronic device 130, a refrigerator located in a dining room among the plurality of external electronic devices. For example, in response to the multimedia content having a context of a health guide, the processor 210 may identify, as the external electronic device 130, a TV located in a living room among the plurality of external electronic devices. For further example, in response to the multimedia content having a context requiring an exchange of a voice signal with the user, the processor 210 may identify, as the external electronic device 130, a speaker located in the living room among the plurality of external electronic devices. However, the present disclosure is not limited thereto.

As described above, the electronic device 110 may provide an enhanced convenience to the user, by identifying the external electronic device based on a context of multimedia content that will be reproduced continuously.

Figure 11:
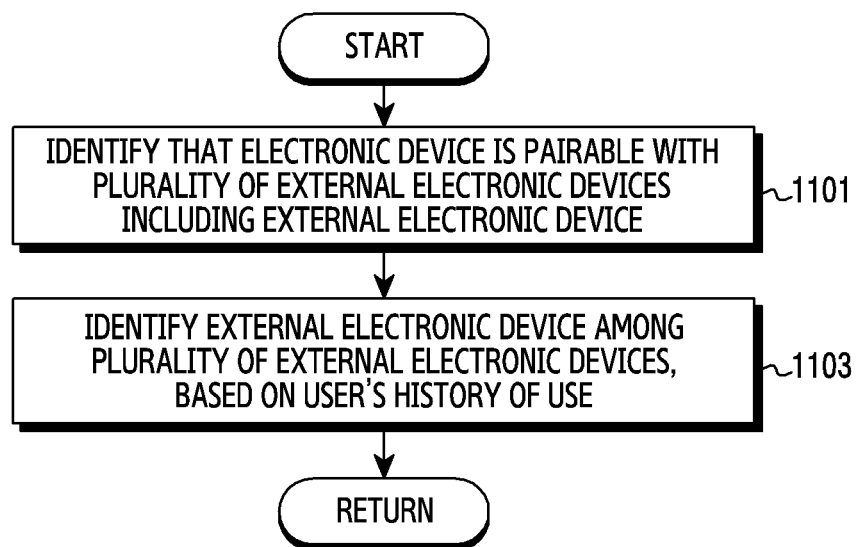
FIG. 11 is a flowchart of a method of an electronic device for identifying an external electronic device according to an embodiment.

FIG. 11 is a flowchart of a method of an electronic device for identifying an external electronic device according to an embodiment. The method may be performed by the electronic device 110 or the processor 210 included in the electronic device 110.

Referring to FIG. 11, steps 1101 and 1103 may relate to step 303 of FIG. 3.

In step 1101, the processor 210 may identify that the electronic device 110 is pairable with a plurality of external electronic devices including the external electronic device 130. Step 1101 of FIG. 11 may correspond to step 303 of FIG. 3 or step 701 of FIG. 7.

In step 1103, the processor 210 may identify the external electronic device 130 among the plurality of external electronic devices, based on a user's history of use. For example, the electronic device 110 or the second server 160 interlocked with the electronic device 110 may store information about the user's history of use through steps of FIG. 12A and FIG. 12B described below in greater detail. The information about the history of use may include data about the history of use that is based on a type of multimedia content. In this case, the electronic device 110 may identify the external electronic device 130 among the plurality of external electronic devices, based on the information about the history of use which includes data indicating that multimedia content of a type A is continuously reproduced in a TV among the plurality of external electronic devices, multimedia content of a type B is reproduced in a refrigerator among the plurality of external electronic devices, and multimedia content of a type C is reproduced in a speaker among the plurality of external electronic devices. The information about the history of use may include data on the history of use that is based on a type of an application used to reproduce the multimedia content in the electronic device 110. In this case, the electronic device 110 may identify the external electronic device 130 among the plurality of external electronic devices, based on the information about the history of use which includes data indicating that multimedia content having been reproduced in the electronic device 110 by using a first application is continuously reproduced in the TV among the plurality of external electronic devices, and multimedia content having been reproduced in the electronic device 110 by using a second application is continuously reproduced in the refrigerator among the plurality of external electronic devices, and multimedia content having been reproduced in the electronic device 110 by using a third application is continuously reproduced in the speaker among the plurality of external electronic devices. The information about the history of use may include data about the history of use that is based on a time duration of continuously reproducing the multimedia content. In this case, the electronic device 110 may identify the external electronic device 130 among the plurality of external electronic devices, based on the information about the history of use which includes data indicating that, in response to a current time corresponding to morning, multimedia content having been reproduced in the electronic device 110 is continuously reproduced in the TV among the plurality of external electronic devices, in response to the current time corresponding to evening, the multimedia content having been reproduced in the electronic device 110 is continuously reproduced in the refrigerator among the plurality of external electronic devices, and, in response to the current time corresponding to night, the multimedia content having been reproduced in the electronic device 110 is continuously reproduced in the speaker among the plurality of external electronic devices. However, the present disclosure is not limited thereto.

Figure 12A:
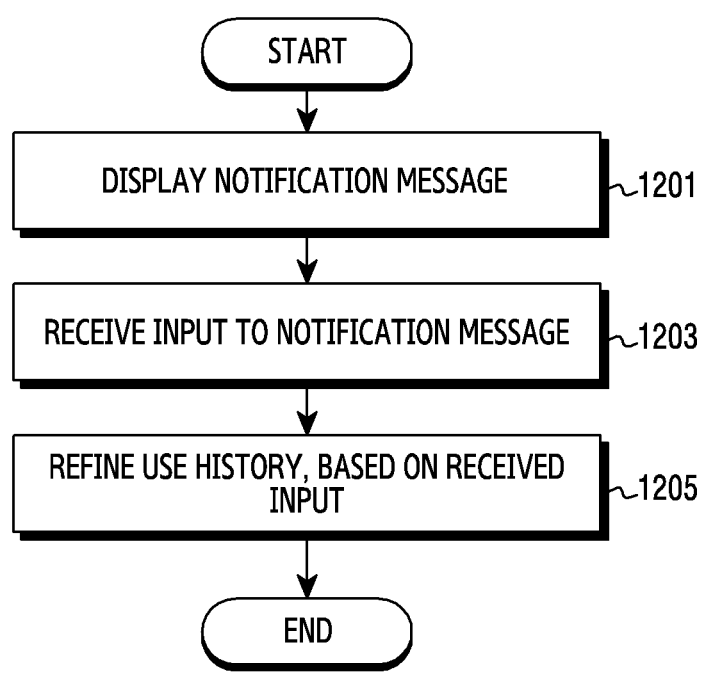
FIG. 12A is a flowchart of a method of an electronic device for refining a history of use according to an embodiment.

FIG. 12A is a flowchart of a method of an electronic device for refining a history of use according to an embodiment. The method may be performed by the electronic device 110 or the processor 210 included in the electronic device 110.

Figure 12B:
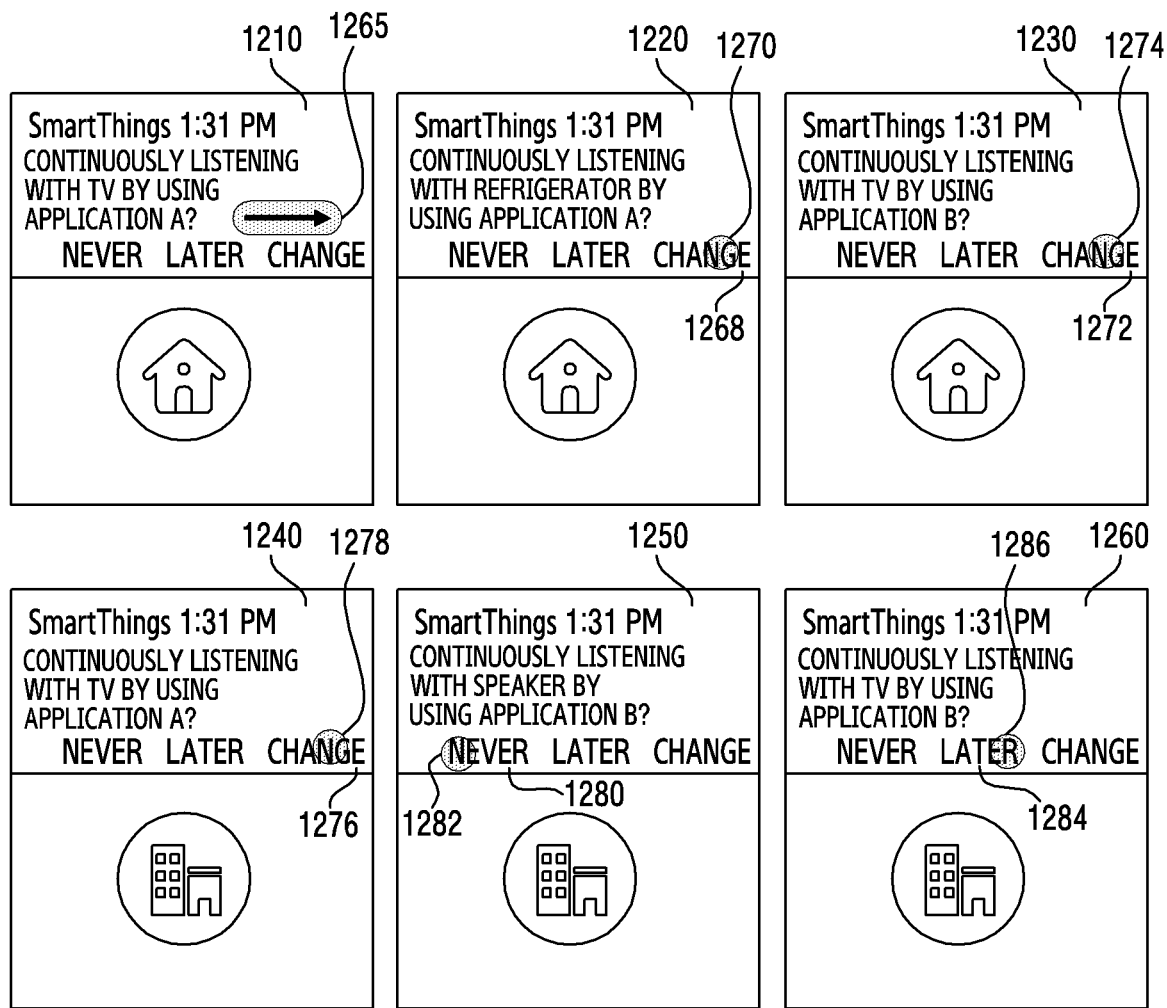
FIG. 12B is an illustration of a notification message displayed in an electronic device according to an embodiment.

FIG. 12B is an illustration of a notification message displayed in an electronic device according to an embodiment.

Referring to FIG. 12A, in step 1201, the processor 210 may display a notification message for inquiring whether the external electronic device 130 will continuously reproduce multimedia content which has been reproduced in the electronic device 110. For example, referring to FIG. 12B, the processor 210 may display a notification message 1210 for inquiring whether to continuously listen to music with a TV by using an application A. For example, the processor 210 may display a notification message 1220 for inquiring whether to continuously listen to music with a refrigerator by using the application A. For example, the processor 210 may display a notification message 1230 for inquiring whether to continuously listen to music with the TV by using an application B. For example, the processor 210 may display a notification message 1240 for inquiring whether to continuously listen to music with the TV by using the application A. For example, the processor 210 may display a notification message 1250 for inquiring whether to continuously listen to music with a speaker by using the application B. For example, the processor 210 may display a notification message 1260 for inquiring whether to continuously listen to music with the TV by using the application B. However, the present disclosure is not limited thereto. On the other hand, the application A and the application B may each correspond to the first application, in view of the fact that the application A and the application B are applications used for the reproduction of the multimedia content.

In step 1203, the processor 210 may receive an input to the notification message. In an embodiment, because the input is able to reflect a user's intention for the notification message, the input may be used to refine the history of use.

In step 1205, the processor 210 may refine the history of use, based on the received input. For example, the information about the history of use may store data about a probability of recommending that each of the plurality of external electronic devices continuously reproduce the multimedia content, as associated with each of the plurality of external electronic devices (or an identifier (ID) of each of the plurality of external electronic devices). The processor 210 may refine the history of use, by altering the data on the probability based on the user's intention expressed through the received input.

For example, referring to FIG. 12B, the processor 210 may receive an input 1265 of dragging the notification message 1210 in a first direction. The processor 210 may recognize that the input 1265 indicates not preferring to continuously listening to music with the TV by using the application A, and, based on the recognition result, decrease the probability of recommending continuously reproducing music with the TV by using the application A. For example, the processor 210 may receive an input 1270 to an object 1268 included in the notification message 1220. The processor 210 may recognize that the input 1270 indicates preferring to continuously listening to music with the refrigerator by using the application A, and, based on the recognition result, increase the probability of recommending continuously reproducing music with the refrigerator by using the application A. For example, the processor 210 may receive an input 1274 to an object 1272 included in the notification message 1230. The processor 210 may recognize that the input 1274 indicates preferring to continuously listening to music with the TV by using the application B, and, based on the recognition result, increase the probability of recommending continuously reproducing music with the TV by using the application B. For example, the processor 210 may receive an input 1278 to an object 1276 included in the notification message 1240. The processor 210 may recognize that the input 1278 indicates preferring to continuously listening to music with the TV by using the application A, and, based on the recognition result, increase the probability of recommending continuously reproducing music with the TV by using the application A. For example, the processor 210 may receive an input 1282 to an object 1280 included in the notification message 1250. The processor 210 may recognize that the input 1282 indicates not preferring to continuously listening to music with the speaker by using the application B, and, based on the recognition result, decrease the probability of recommending continuously reproducing music with the speaker by using the application B. For example, the processor 210 may receive an input 1286 to an object 1284 included in the notification message 1260. The processor 210 may recognize that the input 1286 indicates delaying the identifying of continuously listening to music with the TV by using the application B, and, based on the recognition result, maintain the probability of continuously reproducing music with the TV by using the application B. However, the present disclosure is not limited thereto.

As described above, by refining a history of use based on a user input to a notification message, the electronic device 110 may recommend an external electronic device suitable to the use's intention, as an external electronic device which will continuously reproduce multimedia content.

Figure 13:
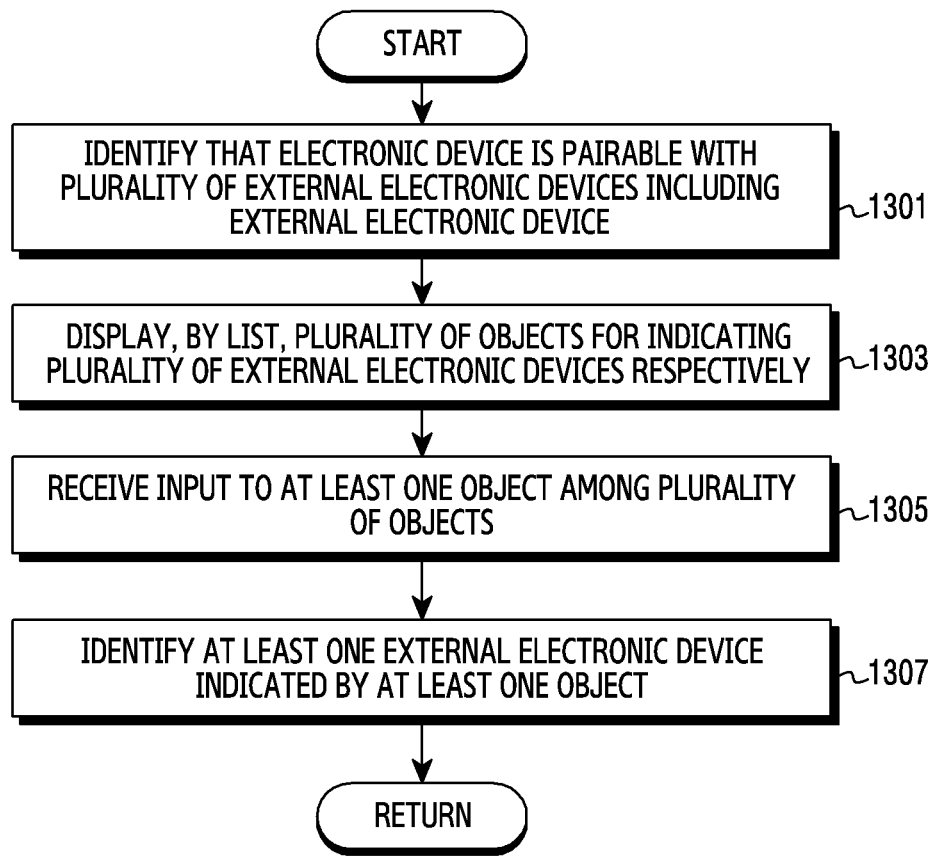
FIG. 13 is a flowchart of a method of an electronic device for identifying an external electronic device according to an embodiment.

FIG. 13 is a flowchart of a method of an electronic device for identifying an external electronic device according to an embodiment. The method may be performed by the electronic device 110 or the processor 210 included in the electronic device 110.

Referring to FIG. 13, steps 1301, 1303, 1305, and 1307 may relate to operation 303 of FIG. 3.

Referring to FIG. 13, in step 1301, the processor 210 may identify that the electronic device 110 is pairable with a plurality of external electronic devices including the external electronic device 130. Step 1301 may correspond to step 303 of FIG. 3 or step 701 of FIG. 7.

In step 1303, the processor 210 may display, as a list, a plurality of objects indicating the plurality of external electronic devices, respectively. For example, the list may be displayed instead of a notification message. For example, the list may be provided from a notification message. For example, the processor 210 may provide a notification message in an extended window, based on an input of dragging the notification message in a downward direction. The processor 210 may display the list in the extended window. For example, the list may be displayed in a quick panel. However, the present disclosure is not limited thereto.

In step 1305, the processor 210 may receive an input to at least one object among the plurality of objects.

In step 1307, the processor 210 may identify at least one external electronic device indicated by the at least one object, as an external electronic device for continuously reproducing the multimedia content. In response to performing step 1307, the processor 210 may perform operations for continuously reproducing the multimedia content in the at least one external electronic device.

Figure 14:
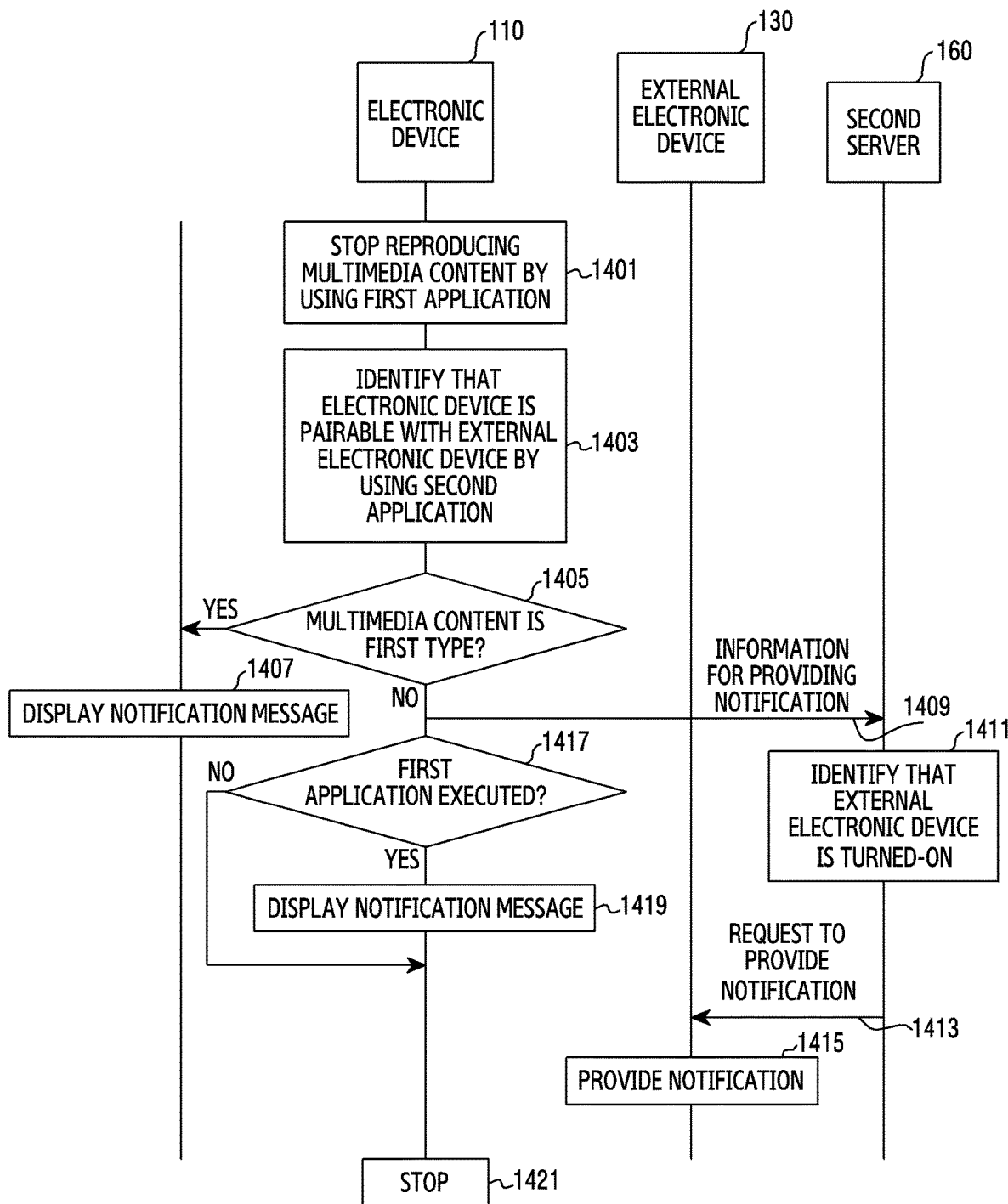
FIG. 14 is a flow diagram of an electronic device, an external electronic device, and a second server for providing a notification in the electronic device or the external electronic device according to an embodiment.

FIG. 14 is a flow diagram of an electronic device, an external electronic device, and a second server for providing a notification in the electronic device or the external electronic device according to an embodiment. The flow diagram may be performed by the electronic device 110, the external electronic device 130, and the second server 160.

Referring to FIG. 14, in step 1401, the electronic device 110 may stop reproducing multimedia content in the electronic device 110 by using a first application. For example, while reproducing the multimedia content by using the first application, in response to receiving an input for stopping the reproduction of the multimedia content through a user interface of the first application, the electronic device 110 may stop reproducing the multimedia content.

In step 1403, the electronic device 110 may identify that the electronic device 110 is pairable with the external electronic device 130 by using a second application, before a specified time elapses from a time of receiving the input.

In step 1405, the electronic device 110 may identify whether the multimedia content is a first type or not. The multimedia content of the first type may indicate multimedia content (e.g., a video) not requiring a provision of visual information. The multimedia content that is not of a first type (e.g., multimedia content of the second type) may indicate multimedia content (e.g., music) requiring a provision of visual information. In response to the multimedia content being of the first type, the electronic device 110 may perform step 1407. In response to the multimedia content not being of the first type (e.g., the multimedia content being of the second type), the electronic device 110 may perform operation 1409.

In step 1407, the electronic device 110 may display the notification message defined in step 305 of FIG. 3, based on identifying that the multimedia content is of the first type.

In step 1409, the electronic device 110 may send the second server 160 information for providing a notification for inquiring whether the external electronic device 130 will continuously reproduce the multimedia content, based on identifying that the multimedia content is not of the first type (e.g., the multimedia content is of the second type). The second server 160 may receive the information from the electronic device 110. In response to receiving the information, the second server 160 may identify or monitor a state of the external electronic device 130 during a specified time. For example, in response to receiving the information, the second server 160 may identify whether the external electronic device 130 is in a turned-on state during the specified time.

In step 1411, the second server 160 may identify that the external electronic device 130 is in a turned-on state at a time of receiving the information, or identify that the external electronic device 130 is converted into the turned-on state through a user input, before a specified time elapses from the time of receiving the information.

In step 1413, in response to identifying that the external electronic device 130 is in a turned-on state, the second server 160 may request the external electronic device 130 to provide the notification. The external electronic device 130 may receive the request from the second server 160.

In step 1415, in response to receiving the request to provide the notification, the external electronic device 130 may provide the notification. For example, in response to receiving the request, the external electronic device 130 may display a notification message superimposed on a screen which is being displayed through a display of the external electronic device 130. The notification message may have the same or similar format with the notification message described above with reference to FIG. 3. For example, in response to receiving the request to provide the notification, the external electronic device 130 may provide the notification configured with a voice signal through a speaker of the external electronic device 130. However, the present disclosure is not limited thereto.

In response to the media content not being of the first type, in step 1417, the electronic device 110 may identify or monitor whether the electronic device 110 executes the first application during a specified time from a time of identifying that the electronic device 110 is pairable with the external electronic device 130 in step 1403. In response to the first application not being executed during the specified time from the time, the electronic device 110 may stop a process of the electronic device 110 for continuously reproducing the multimedia content in the external electronic device 130 in step 1421. In response to the first application being again executed within the specified time from the time or the first application being converted into a foreground state, the electronic device 110 may perform step 1419.

In step 1419, in response to identifying that the first application is again executed within the specified time from the time or the first application is converted into the foreground state, the electronic device 110 may display the notification message as described above with reference to FIG. 3 through the display 230.

In an embodiment, in response to step 1415 being performed, step 1417 and step 1419 may be bypassed or may not be performed. In an embodiment, step 1417 and step 1419 may be performed independently from step 1415.

As described above, in response to the multimedia content being multimedia content requiring visual information, the electronic device 110, the external electronic device 130, and the second server 160 may adaptively provide the notification or the notification message according to a user's action. In other words, the electronic device 110 may provide an enhanced UX.

Figure 15A:
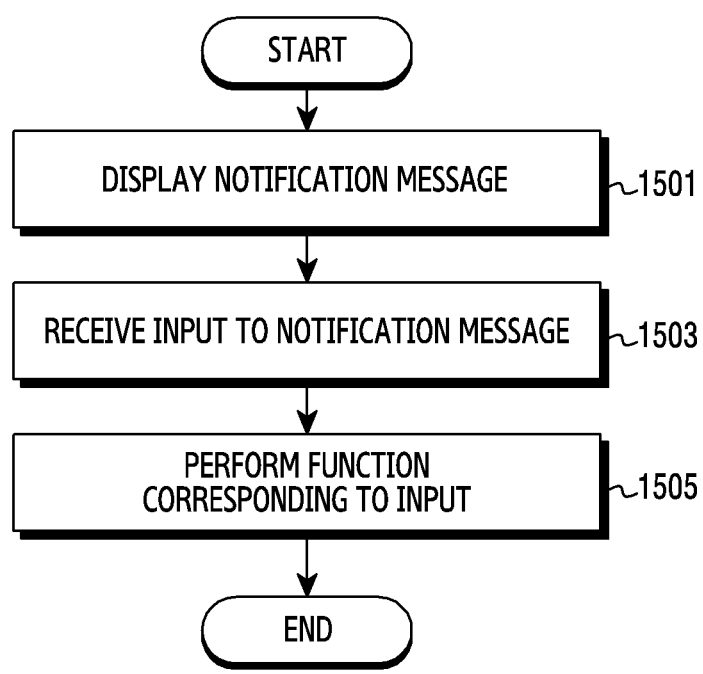
FIG. 15A is a flowchart of a method of an electronic device for displaying a notification message according to an embodiment.

FIG. 15A is a flowchart of a method of an electronic device for displaying a notification message according to an embodiment. The method may be performed by the electronic device 110 or the processor 210 included in the electronic device 110.

Referring to FIG. 15A, steps 1501, 1503, and 1505 may relate to step 305 of FIG. 3.

Figure 15B:
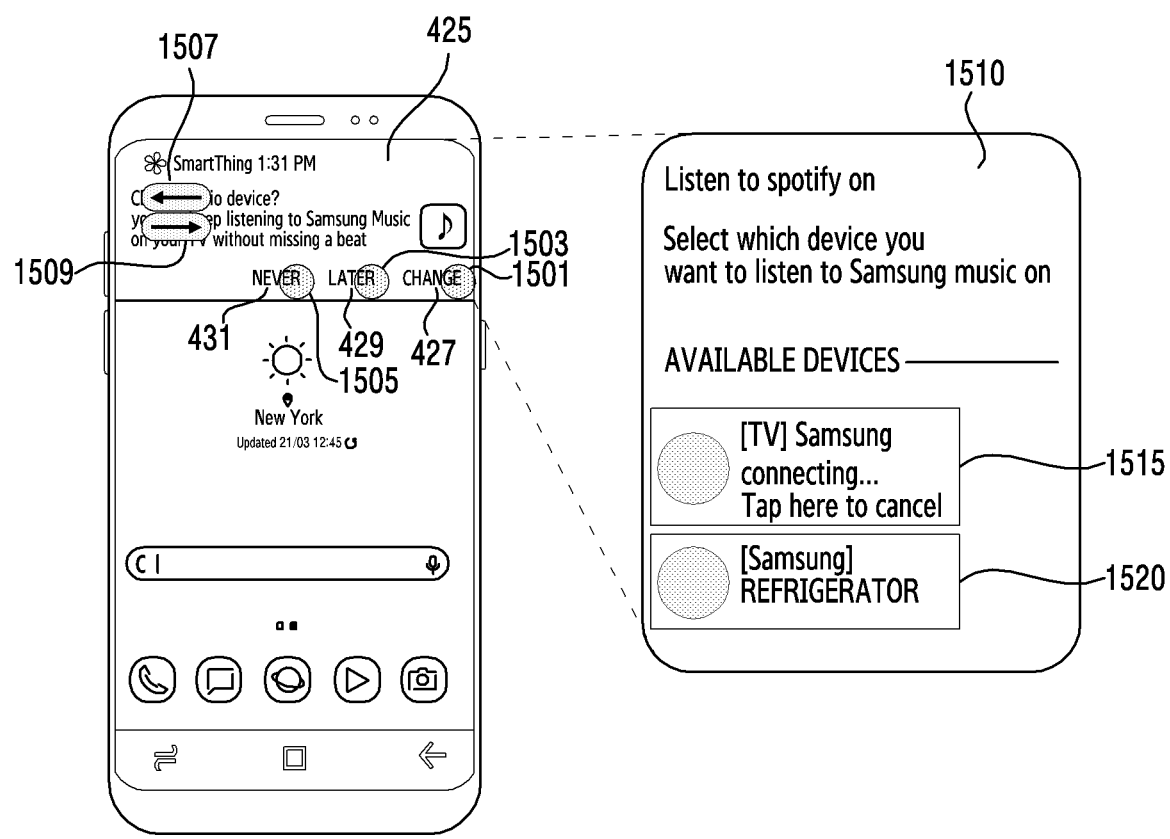
FIG. 15B is an illustration of a screen displayed in an electronic device according to an embodiment.

FIG. 15B is an illustration of a screen displayed in an electronic device according to an embodiment.

Referring to FIG. 15A, in step 1501, the processor 210 may display a notification message. Step 1501 may correspond to step 305 of FIG. 3. For example, referring to FIG. 15B, the processor 210 may display a notification message 425 superimposed on a screen displayed through the display 230, based on identifying that the electronic device 110 is pairable with the external electronic device 130. The notification message 425 may include an object 427, an object 429, and an object 431.

In step 1503, the processor 210 may receive an input to the notification message.

In step 1505, in response to receiving the input to the notification message, the processor 210 may perform a function corresponding to the input.

For example, referring to FIG. 15B, the processor 210 may receive an input 1501 to the object 427. In response to receiving the input 1501, the processor 210 may display a window 1510 converted from the notification message 425. The window 1510 may include a text indicating that the processor 210 is able to select an external electronic device continuously reproducing the multimedia content by using the first application (e.g., Samsung music). The window 1510 may further include an object 1515 indicating that operations (e.g., step 505 to step 519 of FIG. 5) for continuously reproducing the multimedia content in the external electronic device 130 (e.g., a TV) are being performed. The window 1510 may further include an object 1520 for continuously reproducing the multimedia content in another external electronic device (e.g., a refrigerator) instead of the external electronic device 130. For example, in response to receiving an input to the object 1520, the processor 210 may stop performing the operations for continuously reproducing the multimedia content in the external electronic device 130 (e.g., the TV). For example, in response to receiving the input to the object 1520, the processor 210 may send the second server 160 a message for indicating that the external electronic device continuously reproducing the multimedia content is altered into another external electronic device. However, the present disclosure is not limited thereto.

For example, the processor 210 may receive an input 1503 to the object 429. In response to receiving the input 1503, the processor 210 may identify to display the notification message 425 after a specified time elapses, and again display the notification message 425 based on identifying that the specified time elapses.

For example, the processor 210 may receive an input 1505 to the object 431. In response to receiving the input 1505, the processor 210 may stop a process for continuously reproducing the multimedia content in the external electronic device.

For example, the processor 210 may receive an input 1507 of dragging the notification message 425 in a first direction. In response to receiving the input 1507, the processor 210 may identify to display the notification message 425 after a specified time elapses, and again display the notification message 425 based on identifying that the specified time elapses.

For example, the processor 210 may receive an input 1509 of dragging the notification message 425 in a second direction opposite to the first direction. In response to receiving the input 1509, the processor 210 may stop a process for continuously reproducing the multimedia content in the external electronic device.

As described above, the electronic device 110 may enhance a user's convenience, by providing mutually different functions according to an input received through a notification message.

Figure 16:
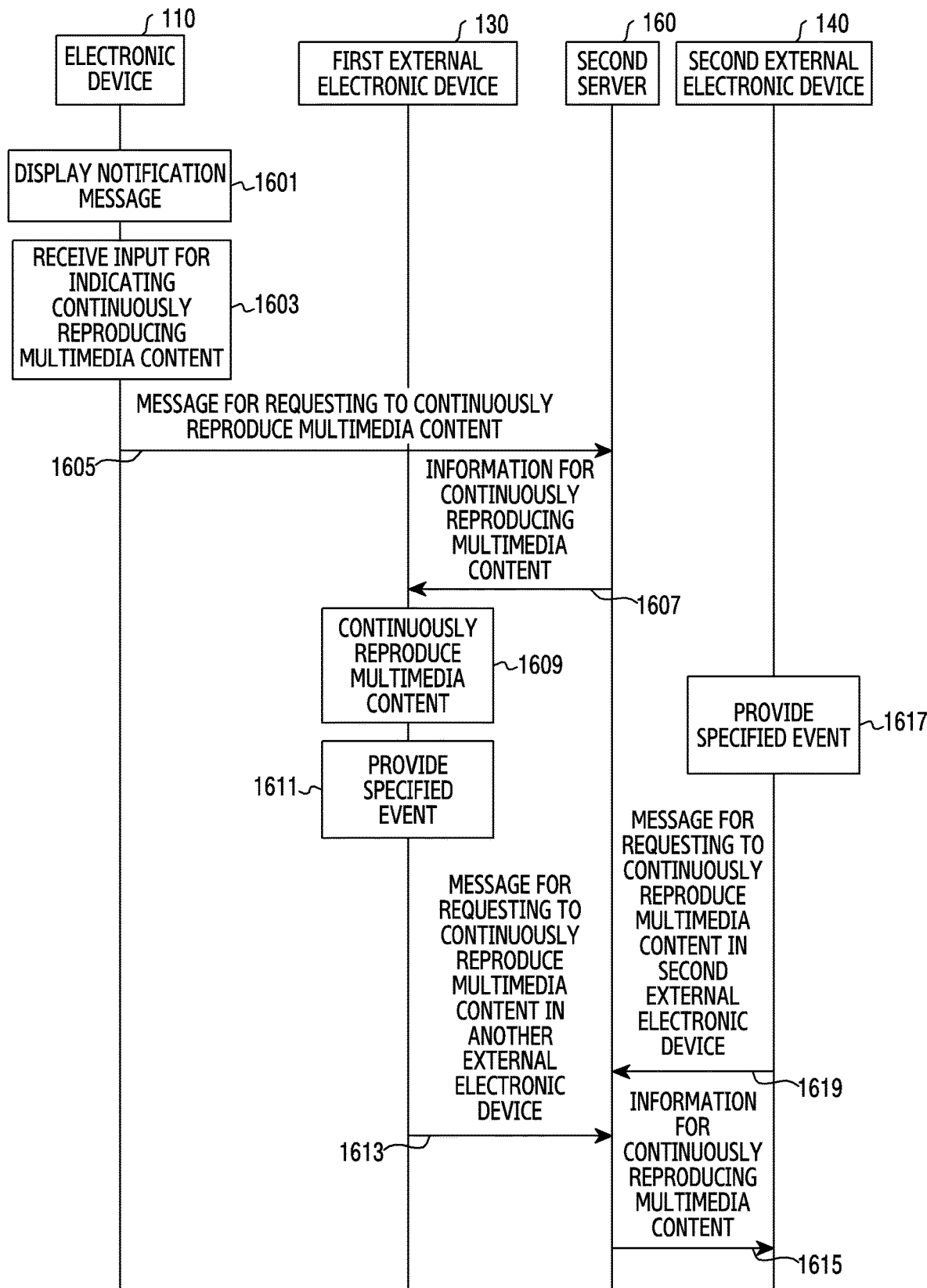
FIG. 16 is a flow diagram of an electronic device, a first external electronic device, a second external electronic device, and a second server for altering or adding an external electronic device continuously reproducing multimedia content according to an embodiment.

FIG. 16 is a flow diagram of an electronic device, a first external electronic device, a second external electronic device, and a second server for altering or adding an external electronic device continuously reproducing multimedia content according to various embodiments. The flow diagram may be performed by the electronic device 110, the first external electronic device 130, the second external electronic device 140, and the second server 160.

Referring to FIG. 16, in step 1601, the electronic device 110 may display a notification message.

In step 1603, the electronic device 101 may receive an input for indicating that the external electronic device 130 continuously reproduces the multimedia content, through the notification message.

In step 1605, in response to receiving the input, the electronic device 101 may send the second server 160 a message for requesting to continuously reproduce the multimedia content. The second server 160 may receive the message from the electronic device 101.

In step 1607, in response to receiving the message for requesting to continuously reproduce the multimedia content, the second server 160 may send the first external electronic device 130 information for continuously reproducing the multimedia content. The first external electronic device 130 may receive the information from the second server 160.

In step 1609, the first external electronic device 130 may continuously reproduce the multimedia content, based on the information.

In step 1611, the first external electronic device 130 may provide a specified event. The specified event may be an event for identifying that it is required to continuously reproduce the multimedia content in another external electronic device 140. For example, the first external electronic device 130 may provide the event, by recognizing that a user is distant from the first external electronic device 130 while continuously reproducing the multimedia content, by using a camera of the first external electronic device 130 or a microphone of the first external electronic device.

In step 1613, in response to the provision of the event, the first external electronic device 130 may send the second server 160 a message for requesting to continuously reproduce the multimedia content in another external electronic device. The message may include information about a time at which the reproduction of the multimedia content has been progressed in the first external electronic device 130 and information for indicating that the user is distant from the first external electronic device 130. The second server 160 may receive the message from the first external electronic device 130.

In step 1615, in response to receiving the message for requesting to continuously reproduce the multimedia content in another external electronic device, the second server 160 may identify the second external electronic device 140 capable of continuously reproducing the multimedia content among a plurality of external electronic devices. For example, in response to receiving the message for requesting to continuously reproduce the multimedia content in another external electronic device, the second server 160 may send a signal requesting to monitor a user who is distant from the first external electronic device 130 to each of the plurality of external electronic devices, and identify that the user is located in proximity to the second external electronic device 140, based on a response signal to the signal received from each of the plurality of external electronic devices. The second server 160 may send the second external electronic device 140 information for continuously reproducing the multimedia content, based on identifying that the user is located in proximity to the second external electronic device 140. The second external electronic device 140 may receive the information from the second server 160. In response to receiving the information, the second external electronic device 140 may continuously reproduce the multimedia content by using the information.

On the other hand, in step 1617, the second external electronic device 140 may provide the specified event, while the first external electronic device 130 continuously reproduces the multimedia content from a time at which the reproduction of the multimedia content has been progressed in the electronic device 110. For example, the second external electronic device 140 may provide the specified event, by identifying that a user of the electronic device 110 is located in proximity to the second external electronic device 140, by using a camera or microphone of the second external electronic device 140.

In step 1619, in response to the provision of the event, the second external electronic device 140 may send the second server 160 a message for requesting to continuously reproduce the multimedia content in the second external electronic device 140. The second server 160 may receive the message. In response to receiving the message for requesting to continuously reproduce the multimedia content in the second external electronic device 140, the second server 160 may request, to the first external electronic device 130, information about the time at which the reproduction of the multimedia content has been progressed in the first external electronic device 130. In response to the request for information about the time at which the reproduction of the multimedia content has been progressed in the first external electronic device 130, the first external electronic device 130 may provide the information about the time at which the reproduction of the multimedia content has been progressed in the first external electronic device 130 to the second server 160. The second server 160 may provide the information to the second external electronic device 140. The second external electronic device 140 may continuously reproduce the multimedia content from the time at which the reproduction of the multimedia content has been progressed in the first external electronic device 130, by using the information.

While the second external electronic device 140 continuously reproduces the multimedia content, an operation (e.g., step 1609) of continuously reproducing the multimedia content in the first external electronic device 130 may be stopped, and may be kept. For example, in response to another user distinguished from the user through the camera of the first external electronic device 130 or the microphone of the first external electronic device 130 being provided, the first external electronic device 130 may maintain an operation of continuously reproducing the multimedia content in the first external electronic device 130, independently from an operation of continuously reproducing the multimedia content in the second external electronic device 140.

As described above, the electronic device 110, the first external electronic device 130, the second external electronic device 140, and the second server 160 may enhance a user's convenience, by altering or adding an external electronic device continuously reproducing multimedia content according to a change of a use state of a user.

Figure 17A:
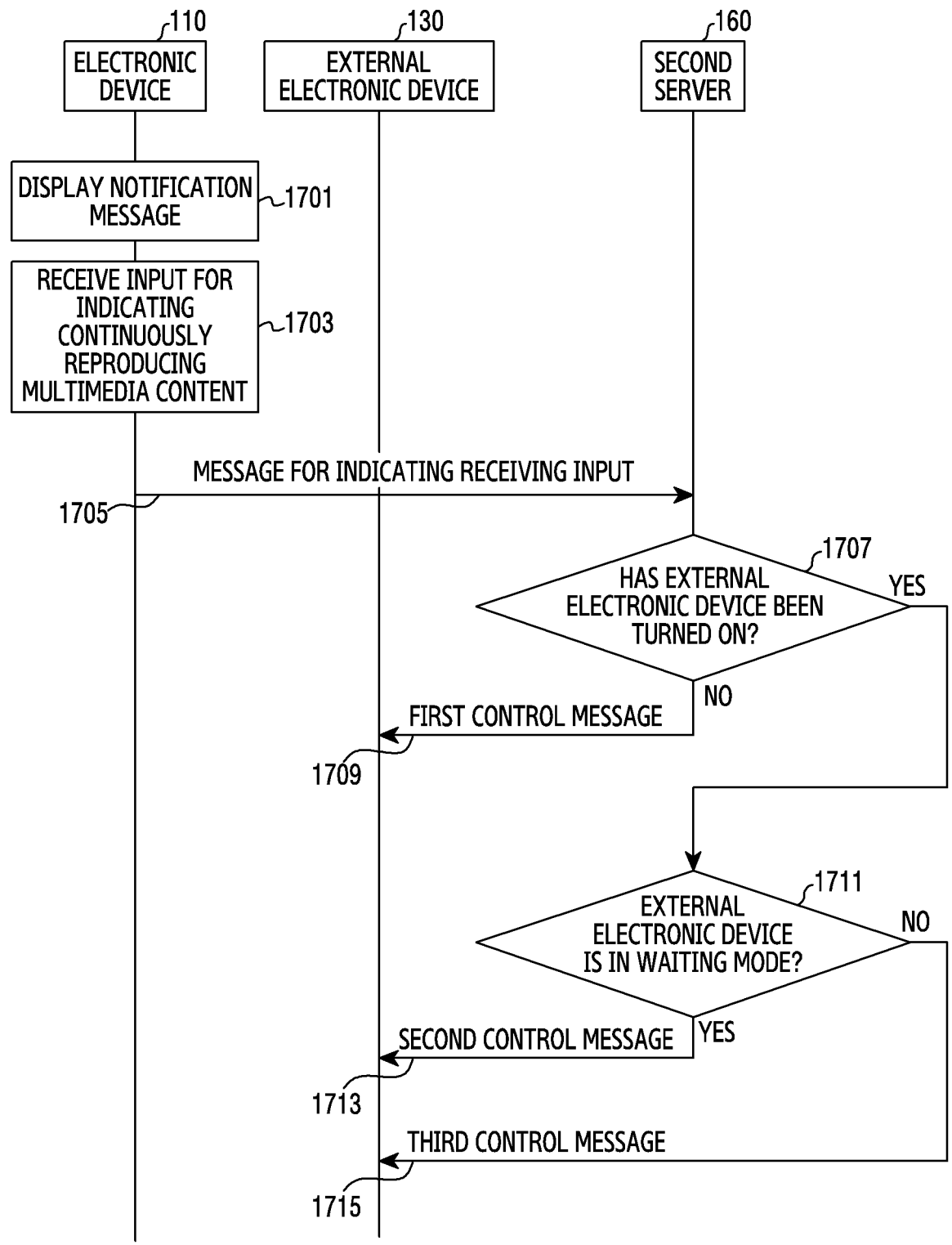
FIG. 17A is a flow diagram of an electronic device, an external electronic device, and a second server for displaying a notification message in the external electronic device according to an embodiment.

FIG. 17A is a flow diagram of an electronic device, an external electronic device, and a second server for displaying a notification message differently in the external electronic device according to an embodiment. The flow diagram may be performed by the electronic device 110, the external electronic device 130, and the second server 160.

Figure 17B:
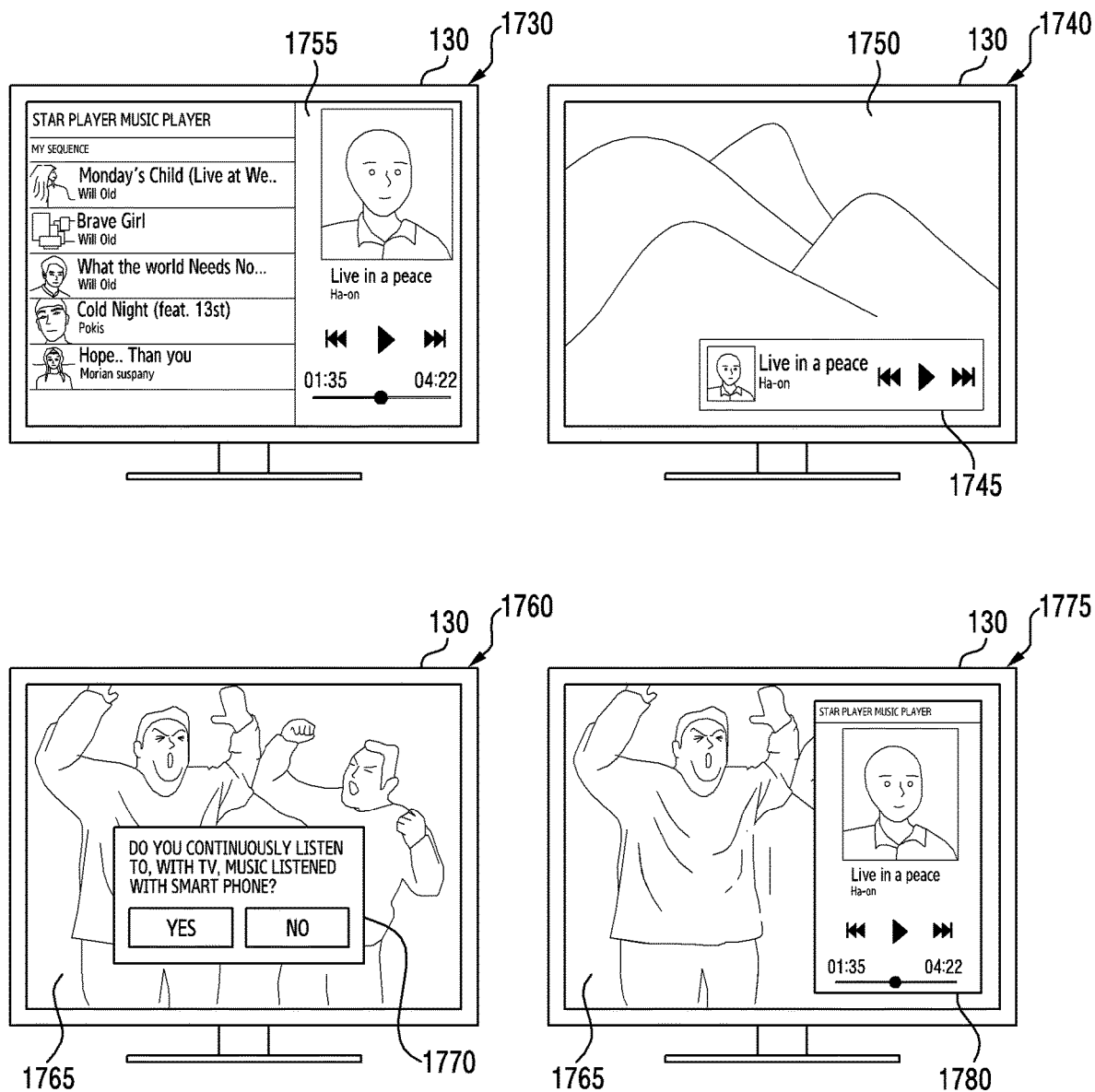
FIG. 17B is an illustration of a screen displayed in an external electronic device according to an embodiment.

FIG. 17B is an illustration of a screen displayed in an external electronic device of an embodiment.

Referring to FIG. 17A, in step 1701, the electronic device 110 may display a notification message.

In step 1703, the electronic device 110 may receive an input for indicating continuously reproducing the multimedia content through the notification message.

In step 1705, in response to receiving the input for indicating continuously reproducing the multimedia content through the notification message, the electronic device 110 may send the second server 160 a message for indicating reception of the input. The second server 160 may receive the message from the electronic device 110.

In step 1707, in response to receiving the message for indicating reception of the input, the second server 160 may identify whether the external electronic device 130 has been turned on. For example, the second server 160 may identify whether the external electronic device 130 has been turned on, based on information provided from the AP 120 or information provided from the external electronic device 130. In response to identifying that the external electronic device 130 has been turned on, the second server 160 may perform step 1711. In response to identifying that the external electronic device 130 has been turned off, the second server 160 may perform step 1709.

In step 1709, the second server 160 may send a first control message to the external electronic device 130, based on identifying that the external electronic device 130 has been turned off. The external electronic device 130 may receive the first control message. The external electronic device 130 receiving the first control message may alter a state of the external electronic device 130 from a turned-off state to a turned-on state, based on the first control message, and, in response to altering the state of the external electronic device 130 from a turned-off state to a turned-on state, continuously reproduce the multimedia content by using the whole display region of the external electronic device 130. For example, referring to FIG. 17B, the external electronic device 130 may, as in a state 1730, continuously reproduce the multimedia content by using the whole display region of the external electronic device 130.

In step 1711, the second server 160 may identify whether the external electronic device 130 is in a waiting mode, based on identifying that the external electronic device 130 has been turned on. The waiting mode may refer to a mode in which the external electronic device 130 is in a low power state. The waiting mode may refer to a mode of providing a waiting screen through a display of the external electronic device 130. Based on identifying that the external electronic device 130 is in the waiting mode, the second server 160 may perform step 1713. Based on identifying that the external electronic device 130 is not in the waiting mode (i.e., the electronic device 130 is in an active mode distinguished from the waiting mode), the second server 160 may perform step 1715. The active mode may refer to a mode of providing another multimedia content distinguished from the multimedia content through the display of the external electronic device 130.

In step 1713, the second server 160 may send a second control message to the external electronic device 130, based on identifying that the external electronic device 130 is in the waiting mode. The external electronic device 130 receiving the second control message may continuously reproduce the multimedia content, and while continuously reproducing the multimedia content, display a reduced user interface of the first application over a waiting screen for supporting the waiting mode. For example, referring to FIG. 17B, as in a state 1740, while continuously reproducing the multimedia content, the external electronic device 130 may display a reduced user interface 1745 over the waiting screen 1750.

In step 1715, the second server 160 may send a third control message to the external electronic device 130, based on identifying that the external electronic device 130 is not in the waiting mode (e.g., the electronic device is in the active mode). The external electronic device 130 receiving the third control message may continuously reproduce the multimedia content, or display a notification message for inquiring whether to continuously reproduce the multimedia content through the display of the external electronic device 130. For example, referring to FIG. 17B, as in the state 1730, while continuously reproducing the multimedia content, the external electronic device 130 may display a user interface 1755 of the first application converted from another multimedia content which has been provided in the whole display region of the external electronic device 130. For example, as in a state 1760, the external electronic device 130 may display a notification message 1770 superimposed on another multimedia content 1765 which has been provided in the whole display region of the external electronic device 130. For example, as in a state 1775, while continuously reproducing the multimedia content, the external electronic device 130 may display a user interface 1780 of the first application superimposed on the another multimedia content 1765. However, the present disclosure is not limited thereto.

As described above, to continuously reproduce the multimedia content, the electronic device 110, the external electronic device 130, and the second server 160 may display a notification message or a user interface of an application by using various methods in the external electronic device 130.

Figure 18:
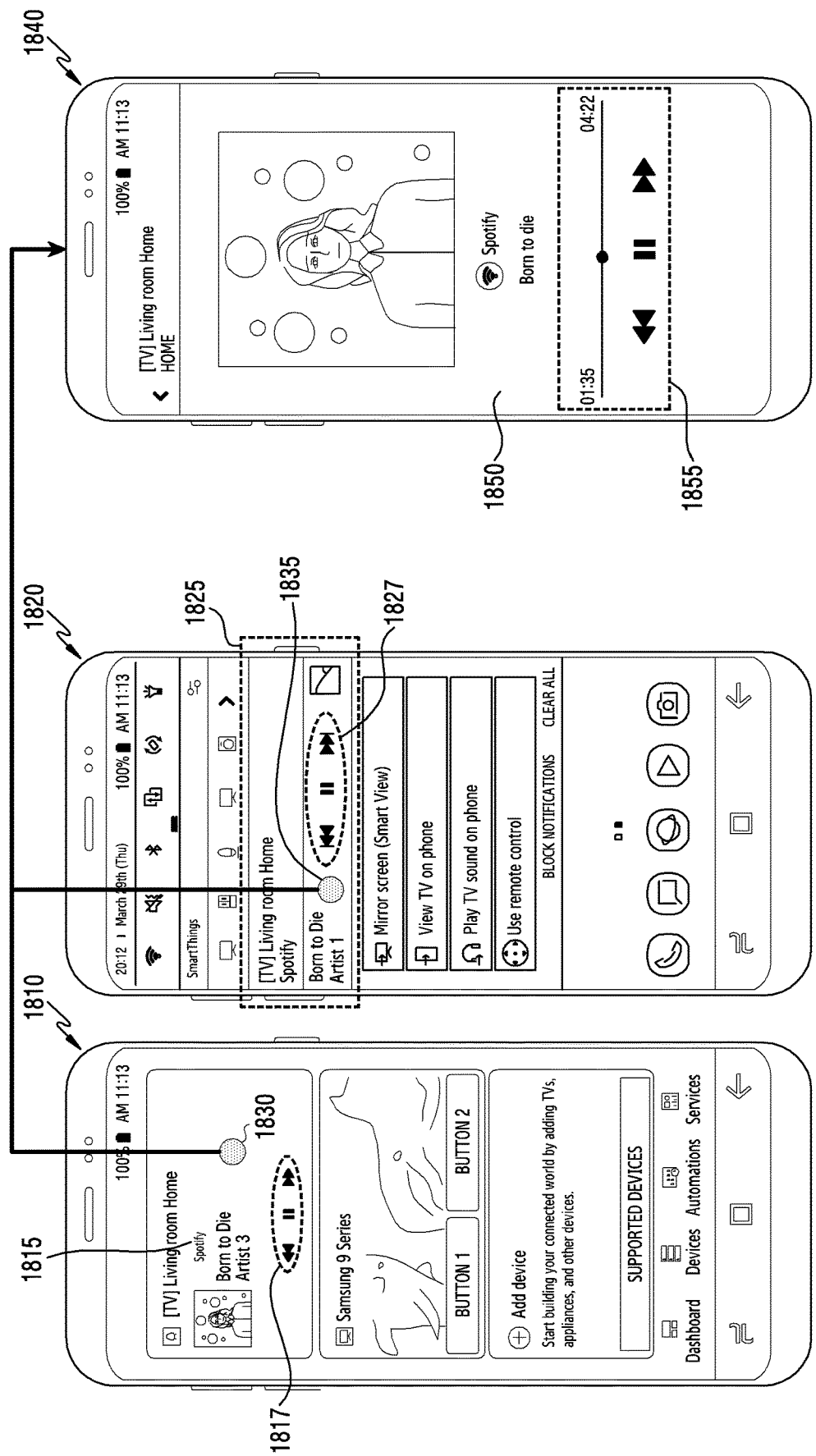
FIG. 18 is an illustration of a screen displayed in an electronic device according to an embodiment.

FIG. 18 is an illustration of a screen displayed in an electronic device according to an embodiment.

Referring to FIG. 18, as in a state 1810, the processor 210 may display a user interface 1815 for controlling multimedia content which is being continuously reproduced in the external electronic device 130, in a user interface of the second application. The user interface 1815 may include a text for indicating what the external electronic device 130 is, and a thumbnail image for the multimedia content, and objects 1817 for controlling the multimedia content. By providing the electronic device 110 with an input to at least one object among the objects 1817, a user may control the multimedia content which is being continuously reproduced in the external electronic device 130, by using the electronic device 110.

As in a state 1820, the processor 210 may display a user interface 1825 for controlling multimedia content which is being continuously reproduced in the external electronic device 130, in a quick panel. The user interface 1825 may include a text for indicating what the external electronic device 130 is, and a thumbnail image for the multimedia content, and objects 1827 for controlling the multimedia content. By providing the electronic device 110 with an input to at least one object among the objects 1827, the user may control the multimedia content which is being continuously reproduced in the external electronic device 130, by using the electronic device 110.

In response to receiving an input 1830 to the user interface 1815 displayed in the state 1810 or an input 1835 to the user interface 1825 displayed in the state 1820, the processor 210 may display, as in a state 1840, a user interface 1850 for controlling the multimedia content which is being continuously reproduced in the external electronic device 130, in the whole display region. The user interface 1850 may include a text for indicating what the external electronic device 130 is, and a thumbnail image for the multimedia content, and objects 1855 for controlling the multimedia content. By providing the electronic device 110 with an input to at least one object among the objects 1855, the user may control the multimedia content which is being continuously reproduced in the external electronic device 130, by using the electronic device 110.

Figure 19A:
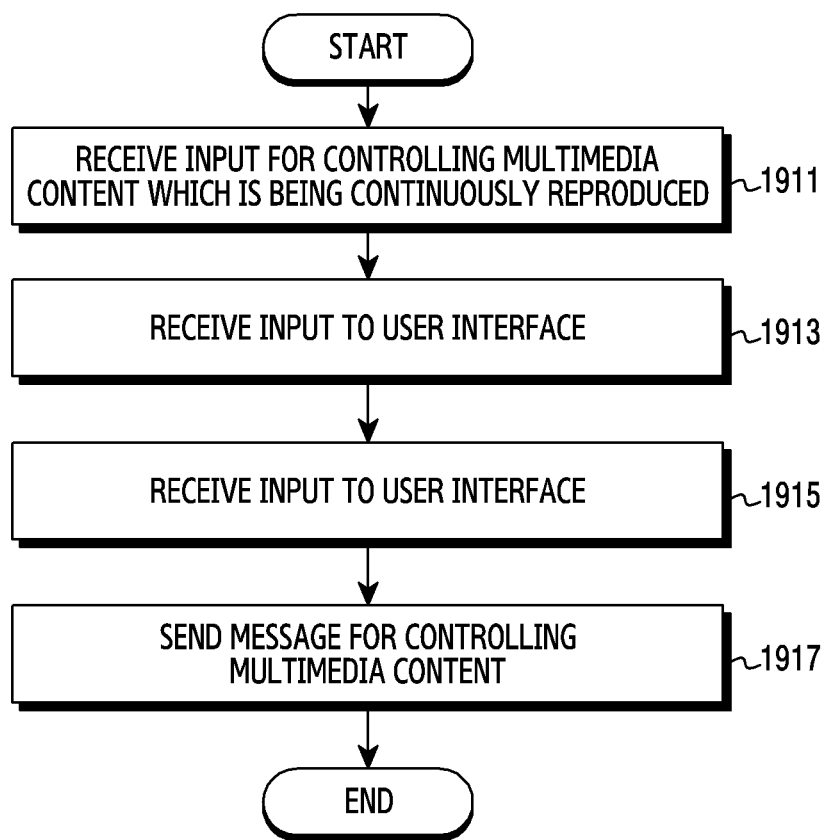
FIG. 19A is a flowchart of a method of an electronic device for displaying a user interface for controlling multimedia content which is being continuously reproduced in an external electronic device according to an embodiment.

FIG. 19A is a flowchart of a method of an electronic device for displaying a user interface for controlling multimedia content which is being continuously reproduced in an external electronic device according to an embodiment. The method may be performed by the electronic device 110 or the processor 210 included in the electronic device 110.

Figure 19B:
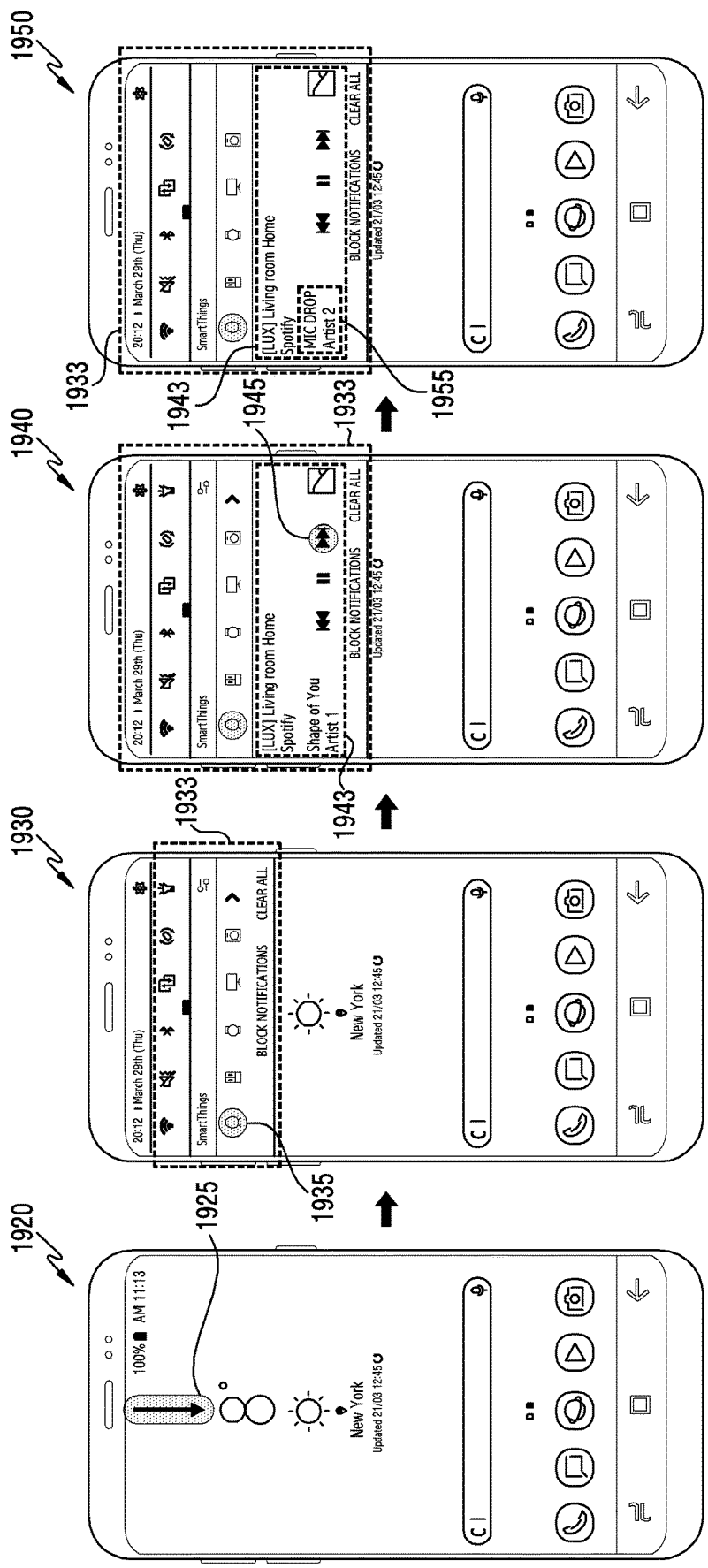
FIG. 19B is an illustration of a screen displayed in an electronic device according to an embodiment.

FIG. 19B is an illustration of a screen displayed in an electronic device according to an embodiment.

Referring to FIG. 19A, in step 1911, the processor 210 may receive an input for controlling multimedia content which is being continuously reproduced. For example, referring to FIG. 19B, while continuously reproducing the multimedia content in the external electronic device 130, in a state 1920, the processor 210 may receive a drag input 1925 of going from a side region of the display 230 to another region of the display 230. In response to receiving the drag input 1925, in a state 1930 converted from the state 1920, the processor 210 may display a quick panel 1933. In the state 1930, the processor 210 may receive an input 1935 to an object for calling the second application included in the quick panel 1933.

In step 1913, in response to receiving the input for to an object for calling the second application, the processor 210 may display a user interface for controlling the multimedia content. For example, referring to FIG. 19B, in response to receiving the input 1935, the processor 210 may convert the state 1930 into a state 1940. The state 1940 may indicate a state of displaying the extended quick panel 1933. The state 1940 may indicate a state of displaying a user interface 1943 for controlling the multimedia content in the extended quick panel 1933.

In step 1915, the processor 210 may receive an input to the user interface for controlling the multimedia content. For example, referring to FIG. 19B, in the state 1940, the processor 210 may receive an input 1945 to an object included in the user interface 1943.

In step 1917, in response to receiving the input to the user interface for controlling the multimedia content, the processor 210 may send a message for controlling the multimedia content. For example, the message may be sent to the second server 160 or to the external electronic device 130. In response to receiving the input to the user interface for controlling the multimedia content, the processor 210 may alter the representation of the user interface. For example, referring to FIG. 19B, in response to receiving the input 1945, the processor 210 may convert the state 1940 into a state 1950. The state 1950 may indicate a state of sending the second server 160 or the external electronic device 130 a message for altering multimedia content which is being continuously reproduced in the external electronic device 130, into multimedia content 1955 subsequent to the multimedia content, based on the input 1945. The state 1950 may indicate a state of altering, based on the input 1945, the representation of the user interface 1943 for controlling the multimedia content displayed in the extended quick panel 1933. In the state 1950, the altered representation of the user interface 1943 may indicate that the multimedia content 1955 is reproduced in the external electronic device 130.

As described above, the electronic device 110 may provide enhanced accessibility to a user, by displaying a user interface for controlling multimedia content which is being continuously reproduced, through the display 230 of the electronic device 110.

Figure 20A:
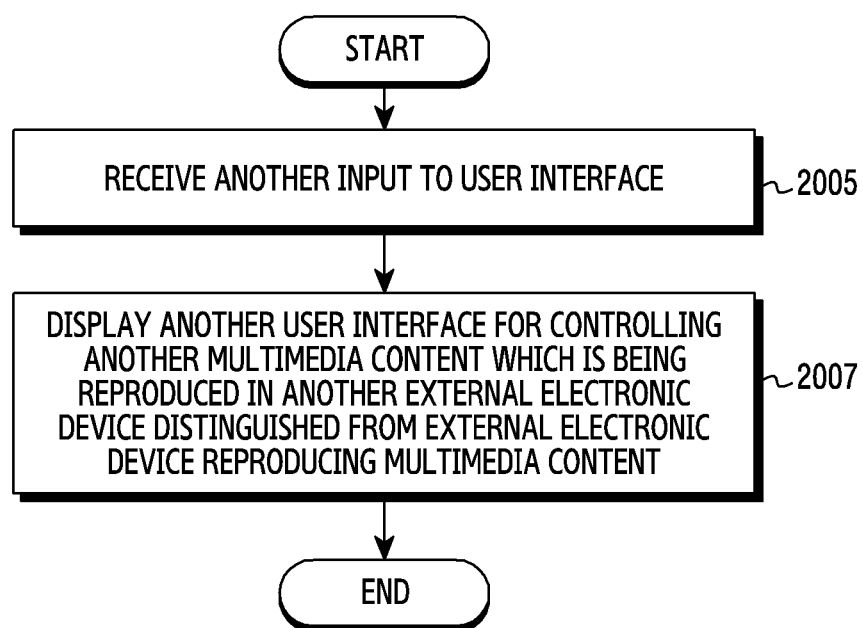
FIG. 20A is a flowchart of a method of an electronic device for altering a user interface for controlling multimedia content which is being continuously reproduced in an external electronic device into a user interface for controlling content which is being provided in another external electronic device distinguished from the external electronic device according to an embodiment.

FIG. 20A is a flowchart of a method of an electronic device for altering a user interface for controlling multimedia content which is being continuously reproduced in an external electronic device, into a user interface for controlling content which is being provided in another external electronic device distinguished from the external electronic device according to an embodiment. The method may be performed by the electronic device 110 or the processor 210 included in the electronic device 110.

Figure 20B:
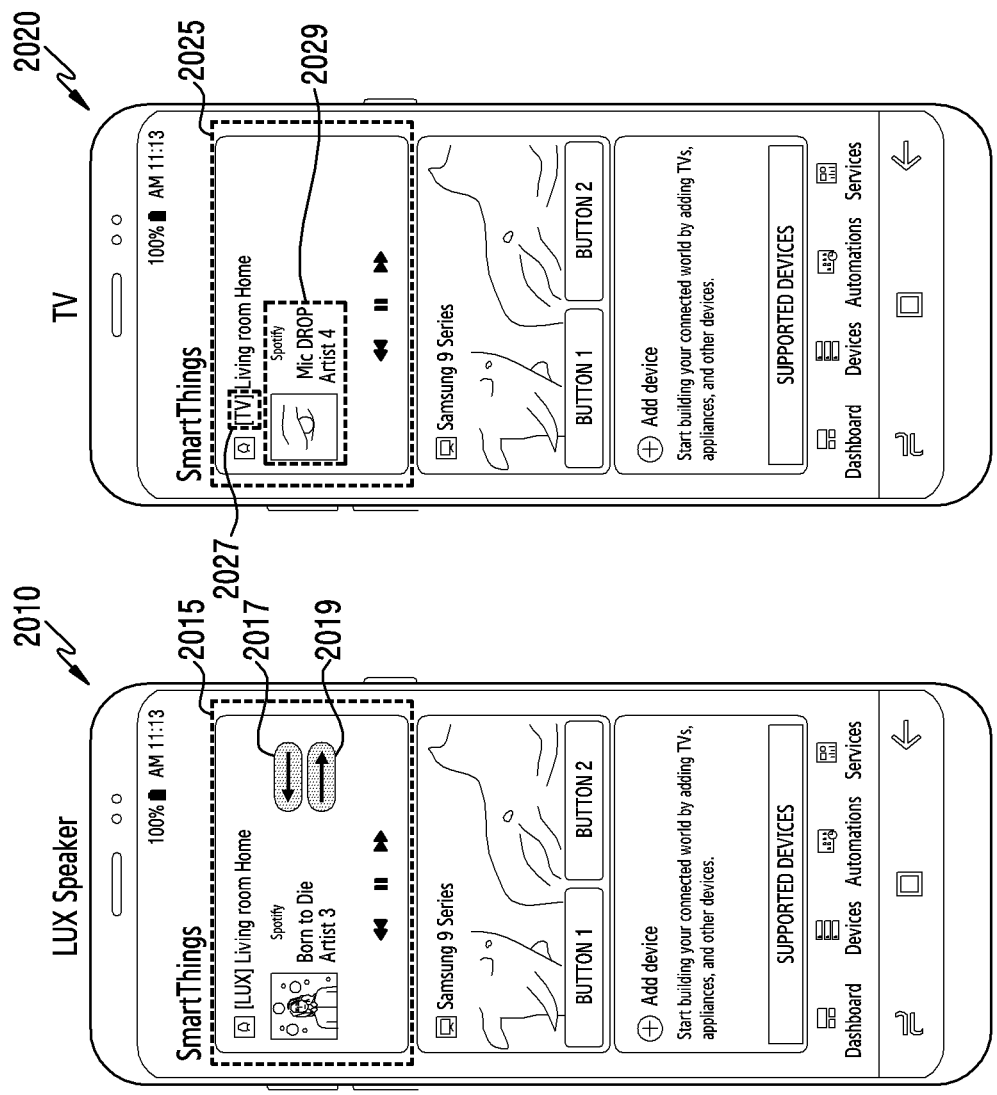
FIG. 20B is an illustration of a screen displayed in an electronic device according to an embodiment.

FIG. 20B is an illustration of a screen displayed in an electronic device according to an embodiment.

Referring to FIG. 20A, in step 2005, the processor 210 may receive another input to a user interface for controlling multimedia content which is being continuously reproduced in the external electronic device 130. For example, referring to FIG. 20B, in a state 2010, the processor 210 may display a user interface 2015 which is included in a user interface of the second application and which is for controlling multimedia content which is being continuously reproduced in the external electronic device 130. In the state 2010, the processor 210 may receive an input 2017 of dragging the user interface 2015 in a first direction or an input 2019 of dragging the user interface 2015 in a second direction.

In step 2007, the processor 210 may display a user interface for controlling another multimedia content which is being reproduced in another external electronic device 140 distinguished from the external electronic device 130 continuously reproducing the multimedia content. For example, referring to FIG. 20B, in response to receiving the input 2017 or the input 2019 in the state 2010, the processor 210 may convert the state 2010 into a state 2020. In the state 2020, the processor 210 may display a user interface 2025 for controlling the other multimedia content which is being reproduced in the other external electronic device distinguished from the external electronic device 130. The user interface 2025 may be converted from the user interface 2015. The user interface 2025 may include information 2027 about the other external electronic device distinguished from the external electronic device 130, and information 2029 about the other multimedia content which is being reproduced in the other external electronic device.

As described above, the electronic device 110 may enhance a user's convenience, by displaying not only a user interface for controlling the multimedia content which is being continuously reproduced in an external electronic device but also another user interface for controlling multimedia content which is being reproduced in another external electronic device distinguished from the external electronic device.

Figure 21:
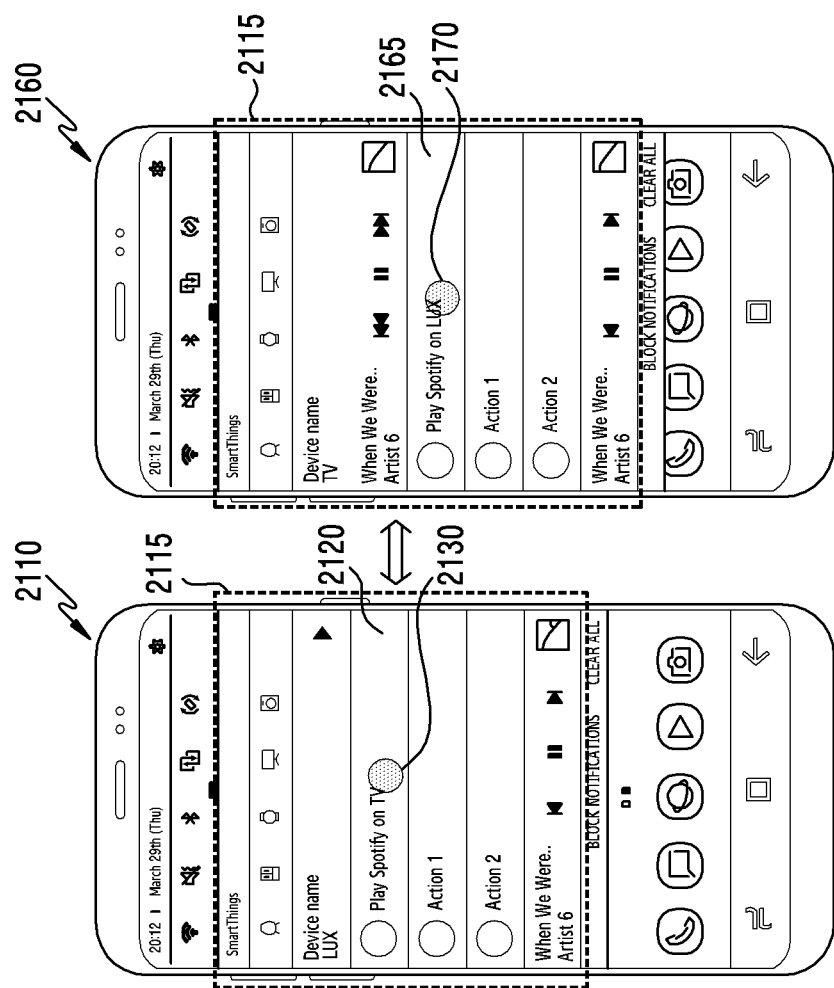
FIG. 21 is an illustration of a screen displayed in an electronic device according to an embodiment.

FIG. 21 is an illustration of a screen displayed in an electronic device according to an embodiment.

Referring to FIG. 21, in a state 2110, while continuously reproducing the multimedia content in the first external electronic device 130 (e.g., a speaker), the processor 210 may display a user interface 2115 for controlling the multimedia content in a quick panel. The user interface 2115 may include an object 2120 for continuously reproducing the multimedia content in the second external electronic device 140 (e.g., a TV) distinguished from the first external electronic device 130. In response to receiving an input 2130 to the object 2120, the processor 210 may convert the state 2110 into a state 2160. In the state 2160, the processor 210 may perform a process for continuously reproducing the multimedia content in the second external electronic device 140, and display, in the second external electronic device 140, a user interface 2165 for indicating that the second external electronic device 140 reproduces the multimedia content. The user interface 2165 may include an object 2165 for continuously reproducing the multimedia content in the first external electronic device 130 (e.g., a speaker) distinguished from the second external electronic device 140. In response to receiving an input 2170 to the object 2165, the processor 210 may convert the state 2160 into the state 2110.

As described above, the electronic device 110 may provide an enhanced UX, by providing a user interface for altering an external electronic device which is continuously reproducing multimedia content, into another external electronic device.

Figure 22A:
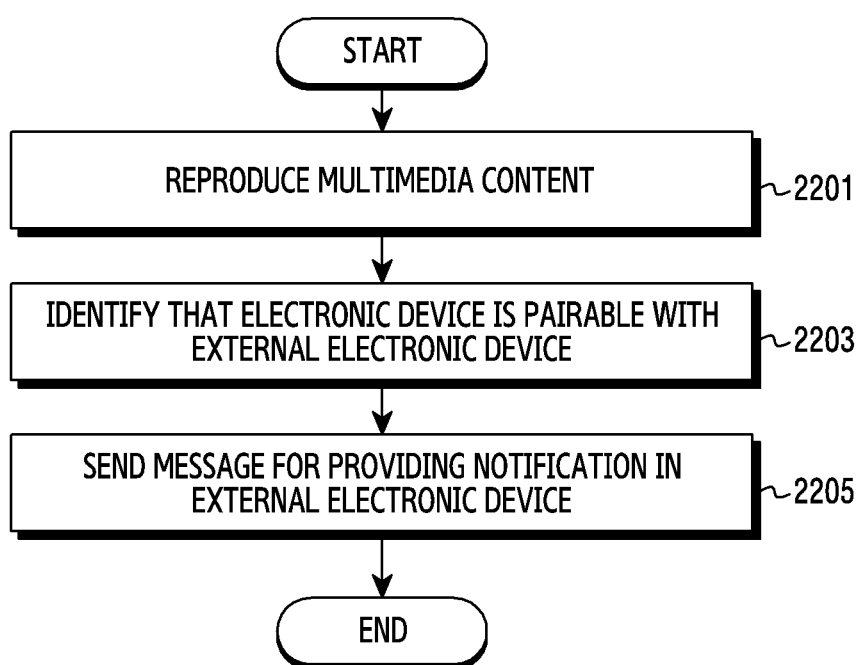
FIG. 22A is a flowchart of a method of an electronic device according to an embodiment.

FIG. 22A is a flowchart of a method of an electronic device according to an embodiment. The method may be performed by the electronic device 110 or the processor 210 included in the electronic device 110.

Figure 22B:
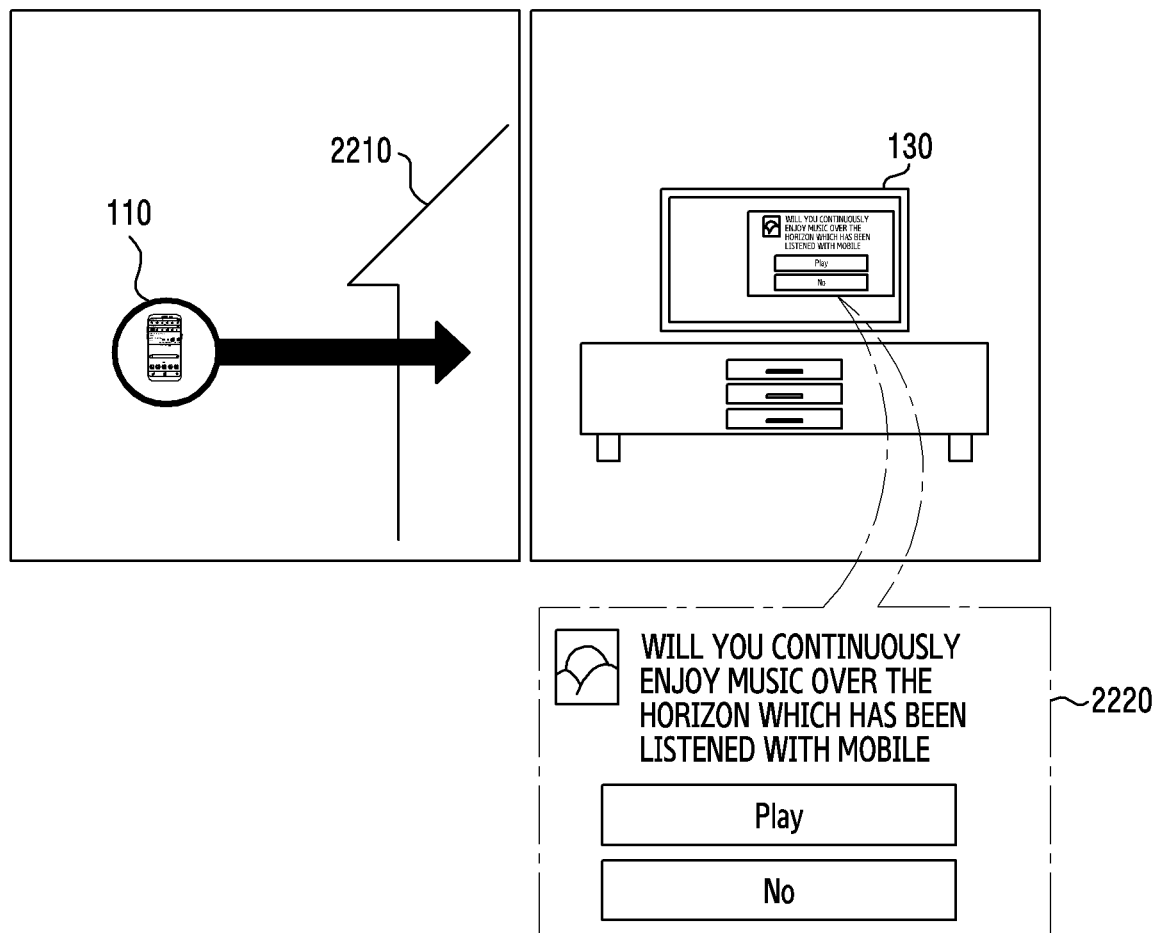
FIG. 22B is an illustration of a screen displayed in an external electronic device of an embodiment.

FIG. 22B is an illustration of a screen displayed in the external electronic device 130 of an embodiment.

Referring to FIG. 22A, in step 2201, the processor 210 may reproduce multimedia content in the electronic device 110. Step 2201 may correspond to step 301 of FIG. 3.

In step 2203, the processor 210 may identify that the electronic device 110 is pairable with the external electronic device 130, before a first time elapses from a time of initiating the reproduction of the multimedia content. Step 2203 may correspond to step 303 of FIG. 3. For example, referring to FIG. 22B, the processor 210 may identify that the electronic device 110 enters an environment (e.g., a house) 2210 including the external electronic device 130.

In step 2205, based on identifying that the electronic device 110 enters the environment 2210, the processor 210 may send the external electronic device 130 a message for providing, in the external electronic device 130, a notification for indicating that the external electronic device 130 is able to continuously reproduce the multimedia content from a time at which the reproduction of the multimedia content has been progressed in the electronic device 110. For example, the message may be sent to the external electronic device 130 through the AP 120, or be directly sent to the external electronic device 130. In response to receiving the message, the external electronic device 130 may provide the notification. The notification may be provided as visual information. For example, referring to FIG. 22B, in response to receiving the message, the external electronic device 130 may display, through a display of the external electronic device 130, a notification message 2220 for indicating that the external electronic device 130 is able to continuously reproduce the multimedia content from a time at which the reproduction of the multimedia content has been progressed in the electronic device 110. The notification may be provided as auditory information or tactile information. However, the present disclosure is not limited thereto.

On the other hand, the processor 210 of the electronic device 101 may receive another message for indicating that the external electronic device 130 is allowed (e.g., authorized) to continuously reproduce the multimedia content, based on receiving an input indicating that the external electronic device 130 is able to continuously reproduce the multimedia content. For example, the other message may be received from the second server 160 or the external electronic device 130. In response to receiving the other message, the processor 210 may display, through the display 230, a user interface including at least one executable object for controlling the multimedia content which is being continuously reproduced in the external electronic device 130. The processor 210 may receive a user input to the at least one executable object and, in response to receiving the user input, send the external electronic device 130 a message for controlling the multimedia content which is being continuously reproduced in the external electronic device 130, or send the second server 160 the message.

Figure 23:
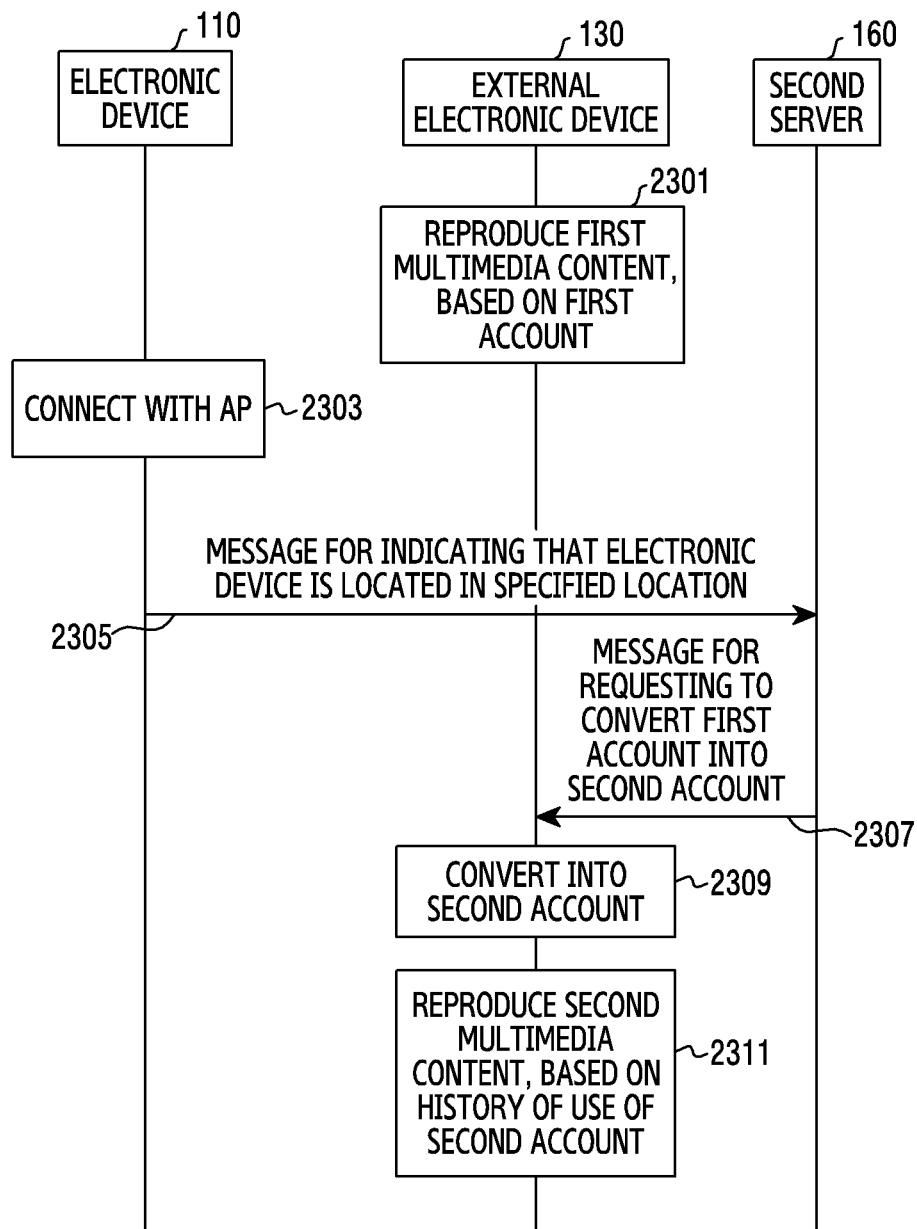
FIG. 23 is a flow diagram of an electronic device, an external electronic device, and a second server for converting a user account in order to continuously reproduce multimedia content according to an embodiment.

FIG. 23 is a flow diagram of an electronic device, an external electronic device, and a second server for converting a user account in order to continuously reproduce multimedia content according to an embodiment. The flow diagram may be performed by the electronic device 110, the external electronic device 130, and the second server 160.

Referring to FIG. 23, in step 2301, the external electronic device 130 may reproduce first multimedia content, based on a first account.

In step 2303, while the external electronic device 130 reproduces first multimedia content based on the first account, the electronic device 110 may be connected with the AP 120. For example, the electronic device 110 may be connected with the AP 120 while the electronic device 110 reproduces second multimedia content distinguished from the first multimedia content based on a second account distinguished from the first account in the electronic device 110 or before a specified time elapses from a time of stopping reproducing, in the electronic device 110, the second multimedia content based on the second account.

In step 2305, in response to the connection with the AP 120, the electronic device 110 may send the second server 160 a message for indicating that the electronic device 110 is located in a specified location (e.g., a house). The second server 160 may receive the message from the electronic device 110. Alternatively, the message may be sent from the AP 120 instead of the electronic device 110, to the second server 160.

In step 2307, in response to receiving the message indicating that the electronic device 110 is located in the specified location, the second server 160 may send the external electronic device 130 a message for requesting to convert the first account into a second account. While reproducing the first multimedia content based on the first account, the external electronic device 130 may receive the message requesting to convert the first account into the second account sent from the second server 160.

In step 2309, in response to receiving the message requesting to convert the first account into the second account, the external electronic device 130 may convert the first account into the second account.

In step 2311, in response to converting the first account into the second account, the external electronic device 130 may reproduce the second multimedia content, based on a history of use of the second account. For example, the external electronic device 130 may continuously reproduce, in the external electronic device 130, the second multimedia content which has been reproduced in the electronic device 110.

As described above, the electronic device 110, the external electronic device 130, and the second server 160 may continuously reproduce, in the external electronic device 130, multimedia content which has been continuously reproduced in the electronic device 110, through the account conversion.

Figure 24:
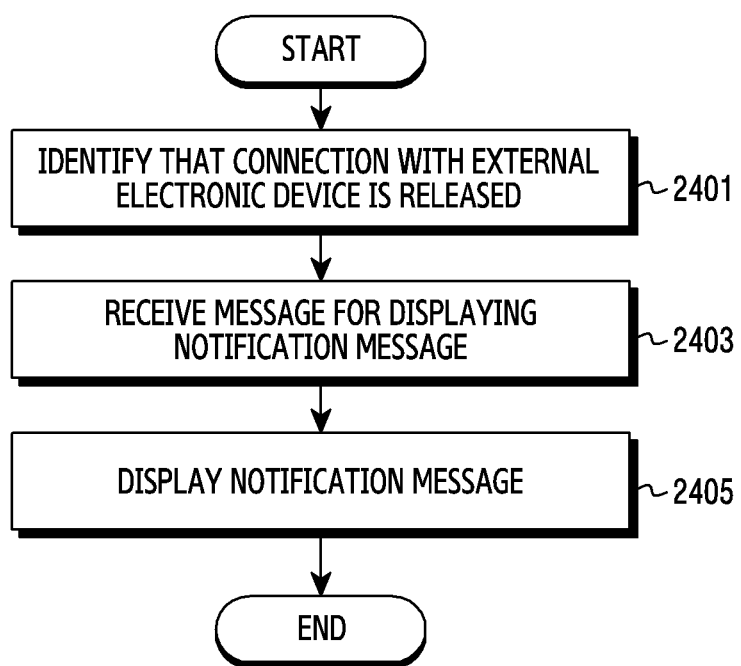
FIG. 24 is a flowchart of a method of an electronic device according to an embodiment.

FIG. 24 is a flowchart of a method of an electronic device according to an embodiment. The method may be performed by the electronic device 110 or the processor 210 included in the electronic device 110.

Referring to FIG. 24, in step 2401, the processor 210 may identify that a connection with the external electronic device 130 (or the AP 120 connected with the external electronic device 130) which is reproducing multimedia content is released.

In step 2403, the processor 210 may receive a message for displaying a notification message for indicating that the electronic device 110 is able to continuously reproduce the multimedia content, from a time at which the reproduction of the multimedia content has been progressed in the external electronic device 130, before a first time elapses from the identifying. For example, the message may be received from the second server 160 or be received from the external electronic device 130. The message may be received through another communication circuitry distinguished from a communication circuitry which is used to identify that the connection with the external electronic device 130 is released.

In step 2405, in response to the receiving the message, the processor 210 may display, through the display 230, the notification message superimposed on a screen which is being displayed through the display 230.

While displaying the notification message superimposed on the screen, the processor 210 may receive a user input to an object which is included in the notification message, which is for allowing the electronic device 110 to continuously reproduce the multimedia content. In response to receiving the user input, the processor 210 may send a message requesting continuous reproduction of the multimedia content in the electronic device, to the second server 160 interlocked with the external electronic device 130 and the electronic device 110. In response to the message requesting continuous reproduction of the multimedia content in the electronic device 110, the processor 210 may receive a message for continuously reproducing the multimedia content from the second server 160. The processor 210 may continuously reproduce the multimedia content, based on the message for continuously reproducing the multimedia content. The message for continuously reproducing the multimedia content may include information about a time at which the reproduction of the multimedia content has been progressed in the external electronic device 130.

As described above, the electronic device 110 may perform operations for continuously reproducing multimedia content, not only when the electronic device 110 enters an environment including an IoT device but also in a situation in which the electronic device 110 breaks away from the environment. The electronic device 101 may provide an enhanced UX, through the performing of these operations.

A method for operating an electronic device as described above includes reproducing multimedia content in the electronic device, identifying whether the electronic device is connectable with an external electronic device interlocked with the electronic device, before a first time elapses from a time of initiating the reproduction of the multimedia content, and superimposing and displaying, on a screen which is being displayed, a visual object indicating that the external electronic device is able to continuously reproduce the multimedia content from a time at which the reproduction of the multimedia content has been progressed in the electronic device, based on identifying whether the electronic device is connectable with an external electronic device interlocked with the electronic device.

The method may further include, while displaying the visual object, receiving a user input to an object included in the visual object and displayed, in order to allow the external electronic device to continuously reproduce the multimedia content, and, in response to receiving the user input, sending a message requesting the external electronic device to continuously reproduce the multimedia content to a server interlocked with the external electronic device and the electronic device. The message sent to the server may include data about a user account of a first application which is used to reproduce the multimedia content in the electronic device and data about a user account of a second application which is used to identify whether the electronic device is connectable with the external electronic device.

Reproducing the multimedia content may include reproducing the multimedia content in the electronic device by using a first application. Identifying whether the electronic device is connectable with the external electronic device may include identifying whether the electronic device is connectable with the external electronic device interlocked with the electronic device by using a second application distinguished from the first application, before the first time elapses from the time of initiating the reproduction of the multimedia content. Displaying the visual object may include displaying the visual object by using the second application, based on identifying whether the electronic device is connectable with the external electronic device.

Identifying whether the electronic device is connectable with the external electronic device may include, while reproducing the multimedia content in the electronic device, receiving an input for stopping the reproduction of the multimedia content in the electronic device, and identifying whether the electronic device is connectable with the external electronic device, before a specified time elapses from a time of receiving the input.

Identifying whether the electronic device is connectable with the external electronic device may include, while reproducing the multimedia content in the electronic device, identifying whether the electronic device is connectable with the external electronic device.

Identifying whether the electronic device is connectable with the external electronic device may include identifying whether the electronic device is connectable with a plurality of external electronic devices interlocked with the electronic device, before the first time elapses from the time of initiating the reproduction of the multimedia content, and, in response to identifying whether the electronic device is connectable with the plurality of external electronic devices, identifying the external electronic device corresponding to the type of the multimedia content among the plurality of external electronic devices. Displaying the visual object may include, in response to identifying the external electronic device, displaying the visual object through the at least one display.

Identifying whether the electronic device is connectable with the external electronic device may include identifying whether the electronic device is connectable with a plurality of external electronic devices interlocked with the electronic device, before the first time elapses from the time of initiating the reproduction of the multimedia content, and, in response to identifying whether the electronic device is connectable with the plurality of external electronic devices, identifying the external electronic device located in a place closest to the electronic device among the plurality of external electronic devices. Displaying the visual object may include, in response to the identifying of the external electronic device, displaying the visual object through the at least one display.

Identifying whether the electronic device is connectable with the external electronic device may include identifying whether the electronic device is connectable with a plurality of external electronic devices interlocked with the electronic device, before the first time elapses from the time of initiating the reproduction of the multimedia content, and, in response to identifying whether the electronic device is connectable with the plurality of external electronic devices, identifying the external electronic device corresponding to a context of the multimedia content obtained based on recognizing the multimedia content among the plurality of external electronic devices. Displaying the visual object may include, in response to the identifying of the external electronic device, displaying the visual object through the at least one display. The multimedia content may be recognized based on at least one keyword included in the multimedia content or metadata of the multimedia content.

A method for operating an electronic device includes reproducing multimedia content in the electronic device, and identifying, through the at least one communication circuitry, whether the electronic device is connectable with an external electronic device interlocked with the electronic device, before a first time elapses from a time of initiating the reproduction of the multimedia content, and sending, to the external electronic device through the at least one communication circuitry, a request message requesting the external electronic device to provide a notification indicating that the external electronic device is able to continuously reproduce the multimedia content from a time at which the reproduction of the multimedia content has been progressed in the electronic device, based on identifying whether the electronic device is connectable with an external electronic device interlocked with the electronic device.

The method may further include receiving a response message responsive to the request message from the external electronic device through the at least one communication circuitry, and identifying whether the external electronic device is allowed (e.g., authorized) to continuously reproduce the multimedia content, in the response message, and, in response to identifying that the external electronic device is allowed to continuously reproduce the multimedia content, displaying, through the display, a user interface including at least one executable object for controlling the multimedia content which is being continuously reproduced in the external electronic device. The method may include receiving a user input to the at least one executable object, and, in response to receiving the user input, sending, to the external electronic device through the at least one communication circuitry, a control message for controlling the multimedia content which is being continuously reproduced in the external electronic device.

Identifying whether the electronic device is connectable with the external electronic device may include identifying whether the electronic device is connectable with a plurality of external electronic devices interlocked with the electronic device, before the first time elapses from the time of initiating the reproduction of the multimedia content, and, in response to identifying whether the electronic device is connectable with the plurality of external electronic devices, identifying the external electronic device corresponding to a current time among the plurality of external electronic devices. Sending the message may include, in response to the identifying of the external electronic device, sending the request message to the external electronic device. Identifying whether the electronic device is connectable with the external electronic device may include obtaining information on a history of use of each of the plurality of external electronic devices, and identifying the external electronic device corresponding to the current time among the plurality of external electronic devices, based on the information on the history of use.

A method for operating an electronic device includes identifying, through the at least one communication circuitry, that a connection with an external electronic device which is reproducing multimedia content is released, and receiving, through the at least one communication circuitry, a message for displaying a visual object indicating that the electronic device is able to continuously reproduce the multimedia content from a time at which the reproduction of the multimedia content has been progressed in the external electronic device, before a first time elapses from the identifying, and, in response to the receiving, superimposing and displaying the visual object on a screen which is being displayed through the at least one display.

The method may further include, while displaying the visual object through the at least one display, receiving a user input to an object included in the visual object and displayed, in order to allow the electronic device to continuously reproduce the multimedia content, and, in response to the receiving of the user input, sending a request message for requesting the electronic device to continuously reproduce the multimedia content, to a server interlocked with the external electronic device and the electronic device. The method may further include, in response to the request message, receiving a response message for continuously reproducing the multimedia content from the server, and continuously reproducing the multimedia content by using a second application distinguished from a first application which is used to identify that the connection with the external electronic device is released, based on the response message.

The message may include information on a time at which the reproduction of the multimedia content has been progressed in the external electronic device.

The at least one communication circuitry may include a first communication circuitry configured to support a first communication technique and a second communication circuitry configured to support a second communication technique distinguished from the first communication technique. Identifying that the connection with the external electronic device is released may include identifying that the connection with the external electronic device is released through the first communication circuitry, and receiving the message may include receiving the message for displaying the visual object through the second communication circuitry.

Methods of the present disclosure may be implemented in the form of hardware, software, or a combination of hardware and software.

In response to being implemented by software, a non-transitory computer-readable storage media storing one or more programs (i.e., software modules) may be provided. The one or more programs stored in the non-transitory computer-readable storage media may be configured to be executable by one or more processors of an electronic device. The one or more programs may include instructions for enabling the electronic device to execute methods of the present disclosure.

Programs (i.e., software modules and/or software) may be stored in a RAM, a non-volatile memory including a flash memory, a ROM, an electrically erasable programmable ROM (EEPROM), a magnetic disc storage device, a compact disc-ROM (CD-ROM), digital versatile discs (DVDs), an optical storage device of another form, and/or a magnetic cassette. In addition, the program may be stored in a memory that is configured in combination of some or all of the above-identified storage devices. In addition, each configured memory may be included in plural.

Furthermore, the program may be stored in an attachable storage device that may be accessed through a communication network such as the Internet, an intranet, a local area network (LAN), a wireless LAN (WLAN), or a storage area network (SAN), or a communication network configured in combination thereof. The storage device may access a device performing an embodiment of the present disclosure through an external port. In addition, a separate storage device on the communication network may access the device of the present disclosure.

In the aforementioned embodiments of the present disclosure, elements included in the present disclosure have been expressed in the singular form or plural form according to a certain embodiment. However, the expression of the singular form or plural form is selected suitable to a given situation for the sake of description convenience, but the present disclosure is not intended to be limited to singular or plural elements. An element expressed in the plural form may be constructed in the singular form, and an element expressed in the singular form may be constructed in the plural form.

While a detailed description of embodiments of the present disclosure has been described above, various modifications are available without departing from the scope of the present disclosure as defined by the appended claims and their equivalents.

What is claimed is:

1. An electronic device, comprising:
a display;
a memory configured to store instructions;
at least one communication circuitry; and
at least one processor configured to, when executing the instructions:
reproduce multimedia content in the electronic device,
identify a plurality of external devices capable of continuously reproducing the multimedia content,
in response to identifying the plurality of external devices, control the display to display a notification message,
receive a first input on the notification message,
in response to receiving the first input on the notification message, control the display to display a plurality of objects respectively indicating the plurality of external devices in an extension of the notification message, and
in response to a second input to an object among the plurality of objects, authorize an external device indicated by the object to continuously reproduce the multimedia content.

2. The electronic device of claim 1, wherein the at least one processor is further configured to, when executing the instructions, control the display to display a list comprising at least one of the plurality of objects in a quick panel.

3. The electronic device of claim 1, wherein the at least one processor is further configured to, when executing the instructions, identify, through the at least one communication circuitry, whether the plurality of external devices interlocked with the electronic devices are connectable with the electronic device, to identify the plurality of external devices.

4. The electronic device of claim 1, wherein the at least one processor is further configured to:
in response to identifying that the external device is authorized to continuously reproduce the multimedia content, display, through at least one display of the external device, a user interface comprising at least one executable object that controls the multimedia content which is being continuously reproduced in the external device;
receive a user input to the at least one executable object; and
control the multimedia content which is being continuously reproduced in the external device based on the user input.

5. The electronic device of claim 1, wherein the at least one processor is further configured to:
- identify at least one external device corresponding to a type of the multimedia content from among the plurality of external devices; and
- control the display of the plurality of objects to indicate the at least one external device.

6. The electronic device of claim 1, wherein the at least one processor is further configured to:
- identify a context of the multimedia content based on at least one of metadata of the multimedia content or an element configuring the multimedia content; and
- identify the external device based on the context of the multimedia content.

7. The electronic device of claim 1, wherein the at least one processor is further configured to:
- receive a drag input; and
- control the reproduction of the multimedia content in the external device based on the drag input.

8. A method for controlling an electronic device, comprising:
- reproducing multimedia content in the electronic device;
- identifying a plurality of external devices capable of continuously reproducing the multimedia content,
- in response to identifying the plurality of external devices, control the display to display a notification message;
- receive a first input on the notification message;
- in response to receiving the first input on the notification message, controlling a display of the electronic device to display a plurality of objects respectively indicating the plurality of external devices in an extension of the notification message; and
- in response to a second input to an object among the plurality of objects, authorizing an external device indicated by the object to continuously reproduce the multimedia content.

9. The method of claim 8, wherein controlling the display of the electronic device to display the plurality of objects comprises controlling the display to display a list comprising at least one of the plurality of objects in a quick panel.

10. The method of claim 8, further comprising identifying, through at least one communication circuitry of the electronic device, whether the plurality of external devices interlocked with the electronic devices are connectable with the electronic device, to identify the plurality of external devices.

11. The method of claim 8, further comprising:
- in response to identifying that the external device is authorized to continuously reproduce the multimedia content, displaying, through at least one display of the external device, a user interface comprising at least one executable object that controls the multimedia content which is being continuously reproduced in the external device;
- receiving a user input to the at least one executable object; and
- controlling the multimedia content which is being continuously reproduced in the external device based on the user input.

12. The method of claim 8, wherein controlling the display of the electronic device to display the plurality of objects comprises:
- identifying at least one external device corresponding to a type of the multimedia content from among the plurality of external devices; and
- controlling the display of the plurality of objects to indicate the at least one external device.

13. The method of claim 8, further comprising:
- identifying a context of the multimedia content based on at least one of metadata of the multimedia content or an element configuring the multimedia content; and
- identifying the external device based on the context of the multimedia content.

14. The method of claim 8, further comprising:
- receiving a drag input; and
- controlling the reproduction of the multimedia content in the external device based on the drag input.

* * * * *